(12) United States Patent
Gallagher et al.

(10) Patent No.: US 12,367,244 B2
(45) Date of Patent: Jul. 22, 2025

(54) SYSTEM AND METHODS FOR IMPLEMENTING A FEATURE SET OF HIGH-DIMENSIONAL SPATIAL DATA IN SPORTS PREDICTIONS

(71) Applicant: Stats LLC, Chicago, IL (US)

(72) Inventors: Joe Dominic Gallagher, Wirral (GB); Arun Murali, Bengaluru (IN); Michael Stöckl, Munich (DE); Robert Seidl, Munich (DE); Ysabel Gonzalez-Rico, Atlanta, GA (US); Patrick Joseph Lucey, Chicago, IL (US)

(73) Assignee: Stats LLC, Chicago, IL (US)

( * ) Notice: Subject to any disclaimer, the term of this patent is extended or adjusted under 35 U.S.C. 154(b) by 0 days.

(21) Appl. No.: 18/814,019

(22) Filed: Aug. 23, 2024

(65) Prior Publication Data

US 2025/0068678 A1 Feb. 27, 2025

Related U.S. Application Data

(60) Provisional application No. 63/578,741, filed on Aug. 25, 2023.

(51) Int. Cl.
*G06F 7/00* (2006.01)
*A63B 71/06* (2006.01)
(Continued)

(52) U.S. Cl.
CPC ...... *G06F 16/9035* (2019.01); *A63B 71/0605* (2013.01); *G06F 3/011* (2013.01)

(58) Field of Classification Search
CPC ........ G06F 16/9035; G06F 3/011; G06F 3/16; A63B 71/0605; A63B 24/0087;
(Continued)

(56) References Cited

U.S. PATENT DOCUMENTS 11,679,299 B2 * 6/2023 Power ................ A63B 24/0087
482/8
2012/0071219 A1 * 3/2012 Belmarch ............. A63F 13/828
463/2

(Continued)

OTHER PUBLICATIONS

Fernando Tharindu et al: "Memory Augmented Deep Generative Models for Forecasting the Next Shot Location inTennis", A IEEE Transactions on Knowledge and Data Engineering, IEEE Service Centre, Losalamitos, CA, US, vol. 32, No. 9, Apr. 13, 2019 (Apr. 13, 2019), pp. 1785-1797.

(Continued)

*Primary Examiner* — Md I Uddin
(74) *Attorney, Agent, or Firm* — Bookoff McAndrews PLLC

(57) ABSTRACT

A method for generating a probability for a first action of a sporting event by implementing a feature set, the method including: obtaining an initial set of data relating to the first action of a sporting event, the initial set of data including at least a position of a first player on a surface and a position of a target area on the surface; generating, by a machine learning model, an initial projected scoring probability based on the initial set of data; generating a feature set relating to the sporting event; and modifying, by the machine learning model, the initial projected scoring probability to an updated scoring probability using the feature set.

10 Claims, 22 Drawing Sheets

(51) Int. Cl.
*G06F 3/01* (2006.01)
*G06F 16/9035* (2019.01)

(58) Field of Classification Search
CPC ............ A63B 24/0006; A63B 24/0062; H04N 21/25891; H04N 21/4316; H04N 21/23418; H04N 21/8126
USPC ....... 707/722, 723, 769, 813, 999.01, 999.2, 707/999.001, 17.005; 725/46, 47, 89, 91, 725/134, 142
See application file for complete search history.

(56) References Cited

U.S. PATENT DOCUMENTS

| | | | |
|---|---|---|---|
| 2017/0061314 A1* | 3/2017 | Schnurr | H04N 21/25891 |
| 2020/0230501 A1* | 7/2020 | Schwartz | G06Q 50/34 |
| 2023/0085122 A1* | 3/2023 | Schwartz | G07F 17/3288 463/9 |
| 2023/0106936 A1* | 4/2023 | Dinsdale | G07F 17/3288 463/25 |
| 2023/0196770 A1* | 6/2023 | Anton | G06F 3/16 382/103 |

OTHER PUBLICATIONS

International Search Report of International Application No. PCT/US2024/043906 mailed Dec. 10, 2024, 16 pages.

* cited by examiner

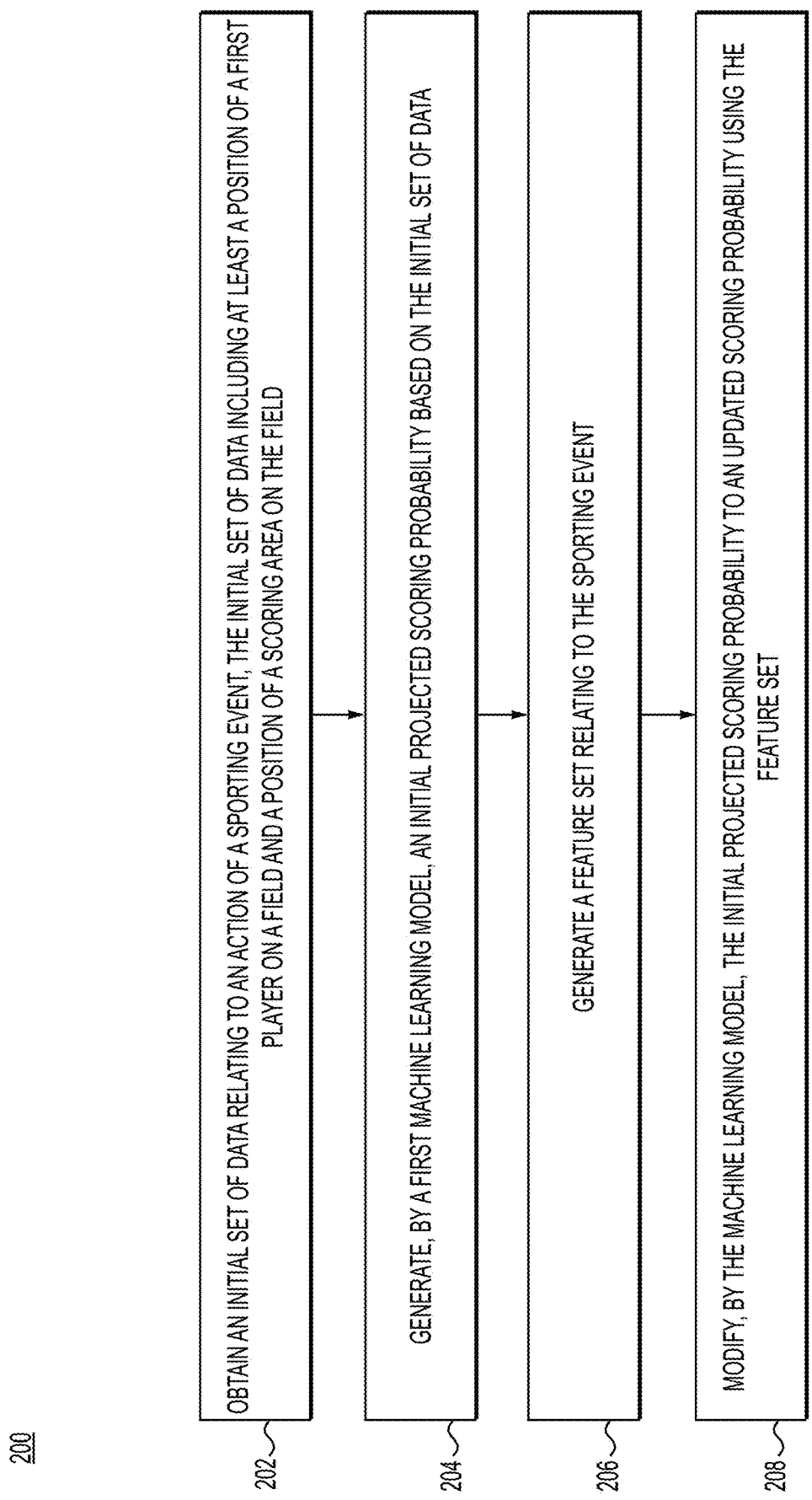

SYSTEM AND METHODS FOR IMPLEMENTING A FEATURE SET OF HIGH-DIMENSIONAL SPATIAL DATA IN SPORTS PREDICTIONS

CROSS-REFERENCE TO RELATED APPLICATIONS

This application claims the benefit of U.S. Provisional Patent Application 63/578,741 filed Aug. 25, 2023, the entire contents of which are incorporated herein by reference for all purposes.

TECHNICAL FIELD

Various aspects of the present disclosure relate generally to machine learning for sports applications. In particular various aspects relate systems and methods for implementing a feature set of high-dimensional spatial data in sports predictions.

BACKGROUND

With an increased popularity in sports, there is an increased desire to have accurate granular predictions of events during a sporting event. For example, having a projection of a probability of a goal, winning, a point, or a projection of a shot location for a sport may be of particular interest for members of the media, broadcast (whether on the primary feed, or a second screen experience), as well as fans, sportsbook, and fantasy/gamification applications. Further, in many cases, such predictions/probabilities can be impacted based on detailed in game statistics.

Unless otherwise indicated herein, the materials described in this section are not prior art to the claims in this application and are not admitted to be prior art, or suggestions of the prior art, by inclusion in this section.

SUMMARY

In some aspects, the techniques described herein relate to a method for generating a probability for a first action of a sporting event by implementing a feature set, the method including: obtaining an initial set of data relating to the first action of a sporting event, the initial set of data including at least a position of a first player on a surface and a position of a target area on the surface; generating, by a machine learning model, an initial projected scoring probability based on the initial set of data; generating a feature set relating to the sporting event, the feature set being derived from any of a position of a second player on the surface, at least one of a distance or an angle between any of the first player, the second player, and the target area of the surface; and modifying, by the machine learning model, the initial projected scoring probability to an updated scoring probability using the feature set.

In some aspects, the techniques described herein relate to a method wherein the machine learning model includes a generative adversarial network (GAN) model, and wherein the GAN model includes at least one of a set of monotonic constraints or a weight for each of the monotonic constraints.

In some aspects, the techniques described herein relate to a method, wherein the feature set includes a previous action type specifying a previous action performed prior to an occurrence of the first action.

In some aspects, the techniques described herein relate to a method, wherein any of the initial set of data and the feature set includes historical save probabilities for the second player.

In some aspects, the techniques described herein relate to a method, wherein the first player and the second player are on opposing teams in the sporting event.

In some aspects, the techniques described herein relate to a method, wherein the feature set includes: a virtual line directed between the position of the first player and the position of the target area; and a distance between the second player and an area of the virtual line.

In some aspects, the techniques described herein relate to a method, wherein the feature set includes the second player's save probability permutation modifying a save probability for each of a set of shot locations at different angles from the virtual line between the position of the first player and the position of the target area.

In some aspects, the techniques described herein relate to a method for generating a projected save probability for a first action of a sporting event using a feature set, the method including: obtaining an initial set of data relating to the first action of a sporting event, the initial set of data including at least a position of an offensive player on a field and a position of a goal on the field; generating, by a machine learning model, an initial projected save probability based on the initial set of data; generating a feature set relating to the sporting event, the feature set derived from any of a position of a defending player on the field, at least one of a distance or an angle between any of the defending player, the offensive player, and the goal, or a presence of one or more additional players within a proximity of the defending player, the offensive player, and the goal; and modifying, by the machine learning model, the initial projected save probability to an updated projected save probability using the feature set.

In some aspects, the techniques described herein relate to a method wherein the feature set includes: a virtual line directed between the position of the offensive player and the position of the goal; and a distance between the position of the defending player and the virtual line between the position of the offensive player and the position of the goal.

In some aspects, the techniques described herein relate to a method, wherein the feature set includes a goalkeeper save probability permutation modifying a goalkeeper save probability for each of a set of shot locations at different angles from the virtual line between the position of the offensive player and the position of the goal.

In some aspects, the techniques described herein relate to a method, wherein the feature set includes a clarity value specifying a number of intervening players positioned within a proximity of the virtual line between the position of the offensive player and the position of the goal.

In some aspects, the techniques described herein relate to a method, wherein the feature set includes a previous action type specifying a previous action performed prior to an occurrence of the first action.

In some aspects, the techniques described herein relate to a method, wherein the first action includes a shot on the goal, the sporting event includes a soccer match, and the defending player is a goalkeeper.

In some aspects, the techniques described herein relate to a method, wherein the feature set includes a shot archetype specifying one or more of a shot type, whether the shot is contested, a distance range of the shot, and/or whether the shot is from a central portion of the field or a lateral portion of the field.

In some aspects, the techniques described herein relate to a method, wherein the machine learning model includes a generative adversarial network (GAN) model, and wherein the GAN model includes at least one of a set of monotonic constraints or a weight for each of the monotonic constraints.

In some aspects, the techniques described herein relate to a method, wherein any of the initial set of data or the feature set includes historical save probabilities for the defending player.

In some aspects, the techniques described herein relate to a method for generating a projected point winner probability for a shot of a tennis match using a feature set, the method including: obtaining an initial set of data relating to an action of a sporting event, the initial set of data including at least a position of a first player on a surface and a position of a target area on the field; generating, by a machine learning model, an initial projected point winner probability based on the initial set of data; generating a feature set relating to the sporting event, the feature set derived from any of a position of a second player on the field, a distance and/or an angle between any of the second player, the first player, and the target area, or a presence of any additional players within a proximity of the second player, the first player, and the target area; and modifying, by the machine learning model, the initial projected point winner probability to an updated projected point winner probability using the feature set.

In some aspects, the techniques described herein relate to a method, wherein the machine learning model includes a generative adversarial network (GAN) model, and wherein the GAN model includes at least one of a set of monotonic constraints or a weight for each of the monotonic constraints.

In some aspects, the techniques described herein relate to a method, wherein the feature set includes: a virtual line directed between the position of the first player and the position of the target area; and a distance between the position of the second player and the virtual line between the position of the first player and the target area.

In some aspects, the techniques described herein relate to a method, wherein the feature set includes data of a shot trajectory, 3D body-pose information of the first player and second player, a current shot count, velocity and acceleration information of the first player and second player, a court surface type, and/or a shot type.

BRIEF DESCRIPTION OF THE DRAWINGS

The accompanying drawings, which are incorporated in and constitute a part of this specification, illustrate various exemplary aspects and together with the description, serve to explain the principles of the disclosed aspects.

FIG. 2 is a flow diagram of an exemplary method for generating a probability for an action of a sporting event by implementing a feature set, in accordance with one or more embodiments.

Figure 1A:
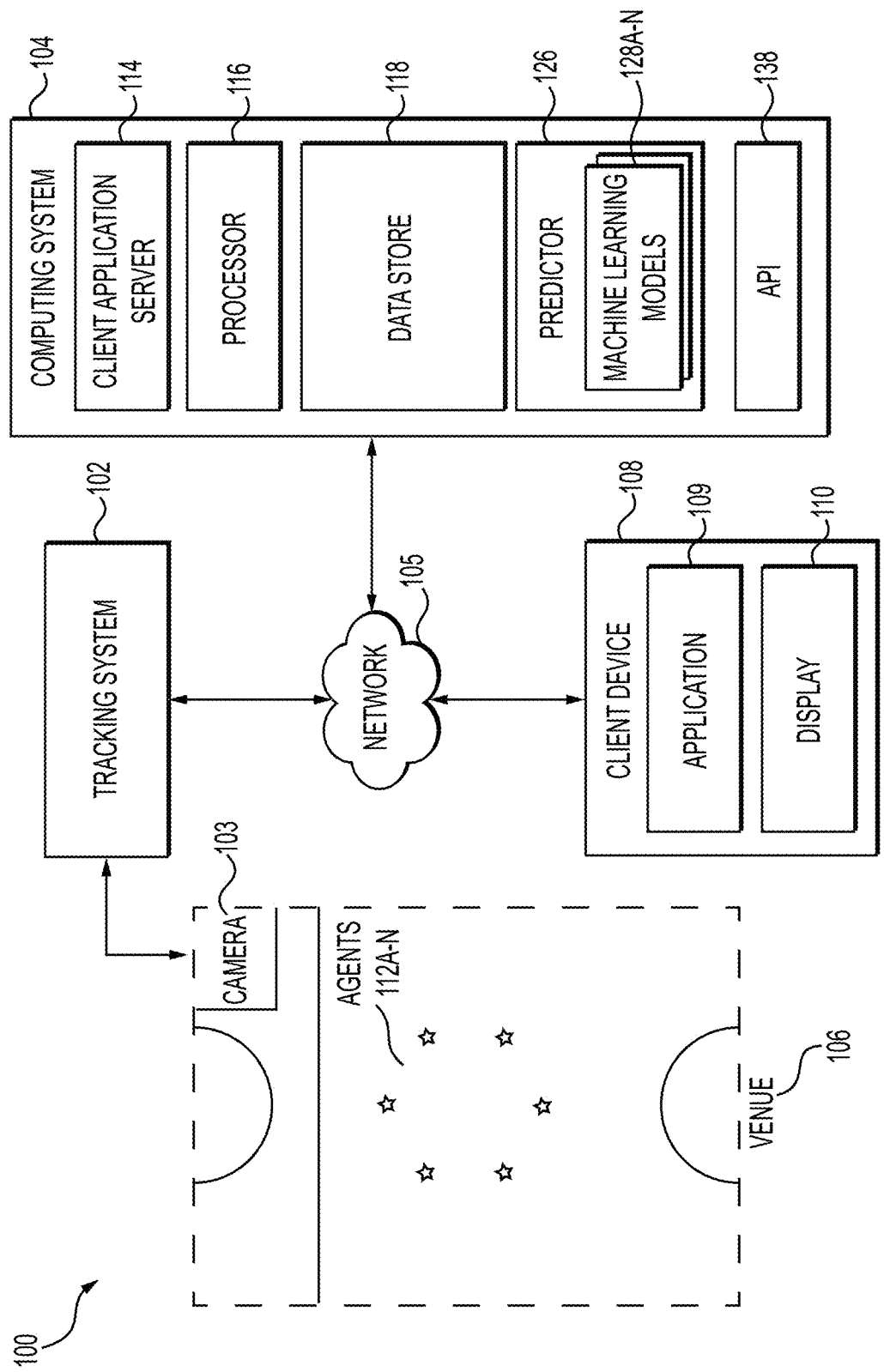
FIG. 1A is a block diagram of an exemplary tracking and analytics environment, in accordance with one or more embodiments.

Notably, for simplicity and clarity of illustration, certain aspects of the figures depict the general configuration of the various embodiments. Descriptions and details of well-known features and techniques may be omitted to avoid unnecessarily obscuring other features. Elements in the figures are not necessarily drawn to scale; the dimensions of some features may be exaggerated relative to other elements to improve understanding of the example embodiments.

DETAILED DESCRIPTION

Various aspects of the present disclosure relate generally to machine learning for sports applications. In particular various aspects relate to systems and methods for generating a projected save probability for an action of a sporting event using a feature set.

One or more embodiments disclosed herein may provide systems and methods for generating a probability for an action of a sporting event by implementing a machine learning model. The system described herein may first utilize an initial set of data for a sporting event to generate an initial probability of an action (e.g., a probability of scoring) of the sporting event. The initial set of data may include at least a position of a first player on a field/court and a position of the target area (e.g., a scoring area for sports having a designated scoring area, a given location on a surface, a given portion of a surface such, a given location likely to result in a score, etc.) on a surface (e.g., field). Further, a feature set may be generated relating to the sporting event. The feature set may include more granular information for the sporting event, such as locations of opposing players, clarity of the first player's vision, shot context, etc. The feature set may include detailed information about opposing players' positions relative to a target area and the first player. The initial projected probability for an action may be modified or augmented by the machine learning model based on the inputted feature set. This data augmentation which incorporates the feature set may allow for edge-case predictions, e.g., when opposing players are out of position, to be considered and for more accurate overall predictions from the machine learning model.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistic regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

While several of the examples herein involve certain types of machine learning, it should be understood that techniques according to this disclosure may be adapted to any suitable type of machine learning. It should also be understood that the examples above are illustrative only. The techniques and technologies of this disclosure may be adapted to any suitable activity.

Machine learning techniques can be used to measure the performance of players in sporting events (e.g., soccer) using granular data relating to the players/teams. A key metric in soccer can be around goal-scoring performance (xG), and this metric can use a small number of features (e.g., position of shot, previous action, big-chance flag). However, models that use such a small set of features may inadequately capture specific situations relating to the shot, such as when the goalkeeper is out of position or whether other players are preventing the goalkeeper from viewing the shot.

Accuracy of a predicted metric can be improved with more granular information, such as goal-keeper position, defensive pressure, clarity of shot (i.e., if the striker can see the goal or if the player has their back to the goal), shot context (i.e., header, left-foot volley, right-foot volley), etc. The systems and methods described herein may incorporate the more granular information in order to achieve more accurate predictions. This may include implementing input features with a high dimensionality (e.g., greater than a threshold number of inputs such as, for example, greater than thirty inputs).

Machine learning models (e.g., neural networks and tree-based methods such as decision forest and bolstered trees) that implement input features with a high dimensionality may have issues with leakage or overfitting. Traditional machine learning model systems may implement training data sets, development data sets, and test data sets that are carefully curated, and with regularization, overfitting may be avoided. However, many traditional systems incorporate an imbalanced dataset (i.e., where training data may be skewed such as having 10% of shots lead to goals) and many examples (e.g., hundreds of thousands of training examples). These traditional system may not have high success in determining outlier or anomalies scenarios in a sporting event.

Traditional systems may incorporate various models to attempt to address outlier scenarios in sporting events. For example, these traditional techniques may include applying a simple model (e.g., a logistic regressor), a model with a smaller amount of features, or a separate model for the outlier situations (i.e., separate model from when the goal-keeper is away from the goal), and given the situation is an outlier, the models may generate a noisy output as the scenario may occur infrequently.

The systems and methods described herein may improve upon the foregoing limitations of traditional systems by determining and incorporating robust features based on granular sports data to more accurately generate one or more predictions. In exemplary uses cases, the method may be employed in a soccer, tennis, hockey, volleyball, etc.

An example scenario where the systems and methods may be implemented is in a soccer game, when a goal-keeper is positioned outside of the box and when a player on the opposing team has the ball in the goal-keeper's team's half of the field. As the goal-keeper's location is only a single variable and this situation may not occur often in training data, traditional systems may not determine that this data point is valuable when determining a probability of an action (e.g., probability in a player scoring). In this scenario, traditional models may have low accuracy in predicting the chances of a goal occurring on a shot, leading to a lower reliability on these traditional models.

The systems and methods described herein, may include machine learning systems that incorporate feature data sets (i.e., additional data points) such as opposing players' locations. For example, when the systems and methods described herein are implemented in relation to soccer, the feature data set may include a goal-keeper location feature, allowing for the system to more accurately predict a likelihood that a shot in a goal in an outlier scenario in a soccer game. In an example use case, the systems and methods described herein may improve upon the foregoing limitations of traditional systems by creating a robust goal-keeper feature based on the permutation of different locations of goal-keepers. This type of sport specific data augmentation can allow for more accurate predictions in edge-case scenarios.

For example, the machine learning model may use an initial set of data relating to an action of a sporting event (e.g., a shot on goal in soccer) to generate an initial projected save probability. The initial set of data can include information relating to a position of the ball and/or a striker relative to a goal. However, using only the initial set of data to generate such a metric may lead to inaccurate predictions, especially in anomalous situations (e.g., whether the goalkeeper is in a position to stop the shot, whether there is a line of sight for the goalkeeper to see the shot).

In response, the system described herein may determine a feature set relating to the sporting event. The feature set can include a robust set of details relating to the action. The feature set can be derived from any of a position of a defending player on the field, a distance and/or an angle between any of the defending player, the offensive player, and the goal, and a presence of any additional players within a proximity of the defending player, the offensive player, and the goal. The machine learning model can modify the initial projected save probability to an updated projected save probability using the feature set. The updated model, which implements the featured dataset, may have more accurate predictions, especially in particular scenarios that do not occur as often in sporting events.

The systems and methods described herein may further relate to other sports (e.g., other team or individual sports). The systems and methods may be incorporated to assist with generating predictions in outlier actions of spotting events. Exemplary use cases may include in tennis when a player has an overhead smash in an open court and misses it, or in ice-hockey when a goal-keeper is out of the net and the attacking team has an open shot. Another example can include basketball, where shots can be blocked/tipped or even intercepted. Instead of creating specific models for these outliers, which can be impractical or resource-intensive, having robust features to capture the nuances of specific sports may be incorporated and utilized to determine accurate predictions. This permutation method as described herein can address such issues.

One or more embodiments described herein may determine a robust feature which captures the nuance of the sport, but also addresses outlier situations. Outlier situations, such as determining a save probability when a goal-keeper is out of goal, may have initial predictions permuted by implementing additional granular data in a feature set. The permutation can be done exhaustively across all locations with operator feedback or could be done with a machine learning model (e.g., generative adversarial network (GAN)) approach. When the feature has been computed, it can then be feed back into the model to essentially "regularize" against these situations (i.e., goal-keeper out of the goal).

In an example case, the model as described herein may be used to quantify the quality of every chance in a game by estimating the likelihood of a success event (e.g., a shot being a goal, a shot scoring a point, etc.). The feature xG can model the likelihood of a success event (e.g., goal or point) at the instant the ball is struck, whereas Expected Goals on Target (xGoT) can model the likelihood of a shot on target being a goal (or being saved) by including information about shot placement and trajectory.

FIG. 1A is a block diagram illustrating a tracking and analytics environment 100, according to example aspects of the disclosure. Environment 100 includes tracking system 102, computing system 104, and client device 108 connected via network 105. In the example depicted, tracking system 102 obtains various attributes of game play, and transmits the measurements across network 105 to computing system 104, where the measurements can be used in conjunction with one or more machine learning models. In an example, tracking system 102 may be configured to obtain initial more simple data (e.g., player location, ball location) in addition to more granular information (e.g., distance and angle of balls/players, save probability, clarity of view, shot context, and/or previous actions). According to an example, granular information may be a subset or detail related to simple data.

Tracking system 102 may be positioned in, adjacent to, or near a venue 106. Non-limiting examples of venue 106 include stadiums, fields, pitches, and courts. Venue 106 includes agents 112A-N (e.g., players, objects, officials, etc.). Tracking system 102 may be configured to record the motions and actions related to agents 112A-N on the playing surface, which may include objects of relevance (e.g., ball, referees, etc.). Although environment 100 depicts agents 112A-N generally as players, it will be understood that in accordance with certain implementations, agents 112A-N may correspond to players, objects, markers (e.g., playing surface markers), officials, and/or the like.

The tracking system 102 and/or data store 118 data may be configured to measure and or record various statistics related to a sporting event. These may include, but are not limited to: player and ball locations; distance and angle of a player relative to a target area; a defending player's save or return probability; pressure provided by players on alternative teams (e.g., distance between players of opposing team to ball); clarity (e.g., vision of player with ball relative to target area); shot context (e.g., the type of shot such as in soccer a free kick, header, volley, first touch, or one-on one); and a previous action (e.g., in soccer a corner, throw-in, through ball, fast break, or a rebound). Additional statistics recorded may include a shot trajectory (e.g., shot impact location, speed, spin or three-dimensional position, and time); position of players (e.g., the three dimensional location of all players); current shot count (e.g., in tennis what hit in a volley); velocity and acceleration of players; court surfaces (e.g., in tennis); game contest (e.g., the score or rally count in tennis); the shot type (e.g., in tennis either the serve, return, forehand, backhand, smash, volley, or a tweener); temperature and wind information; time of day; and/or player attributes (e.g., skill rating at certain strikes such as serve, return, forehand, backhand quality ratings).

In some aspects, tracking system 102 may be an optically-based system using, for example, using camera 103. While one camera is depicted, additional cameras are possible. For example, a system of six stationary, calibrated cameras, which project the three-dimensional locations of players and the ball onto a two-dimensional overhead view of the court may be used. Additional tracking's may be based upon a radio-based system using, for example, radio frequency identification (RFID) tags worn by players or embedded in objects to be tracked.

In another example, a mix of stationary and non-stationary cameras may be used to capture motions of all agents 112A-N on the playing surface as well as one or more objects or relevance. Utilization of such tracking system (e.g., tracking system 102) may result in many different camera views of the court (e.g., high sideline view, free-throw line view, huddle view, face-off view, end zone view, etc.). In some aspects, tracking system 102 may be used for a broadcast feed of a given match. In such aspects, each frame of the broadcast feed may be stored in a game file.

Tracking system 102 may be configured to communicate with computing system 104 via network 105. Computing system 104 may be configured to manage and analyze the data captured by tracking system 102. Computing system 104 may include a web client application server 114, a pre-processing agent 116 (e.g., processor), a data store 118, a predictor 126, and a third-party Application Programming Interface (API) 138. An example of computing system 104 is depicted with respect to FIG. 16.

Pre-processing agent 116 may be configured to process data retrieved from data store 118 or tracking system 102 prior to input to predictor 126. The pre-processing agent 116 and/or predictor 126 may be comprised of one or more software modules. The one or more software modules may be collections of code or instructions stored on a media (e.g., memory of organization computing system 104) which represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store different kinds of data (e.g., in one or more formats). In an example, data store 118 can store raw tracking data received from tracking system 102. The data store 118 may include historical game data, in-game data, outputs derived from any of the models as described herein, and/or non-game data such as player data, injury data, training data, etc. Historical data may include aggregated in game statistics (e.g., a goalkeeper's save percentage or a tennis players return percentage for various types of shots).

Predictor 126 includes one or more machine-learning models 128A-N. The one or more machine-learning models may include generative adversarial network (GAN) and or tree based approaches (e.g., decision forest and boosted trees). The one or more machine-learning models 128A-N may be configured to receive one or more features and to output a prediction related to the sporting event. The outputs may include a projected point winner, a shot winner, a shot trajectory, and or a shot location.

Client device 108 may be in communication with computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with computing system 104, such as individuals who have obtained, will obtain, or may obtain a product, service, or consultation from an entity associated with computing system 104.

Client device 108 may include one more applications 109. Application 109 may be representative of a web browser that allows access to a website or a stand-alone application. Client device 108 may access application 109 to access one or more functionalities of computing system 104. Client device 108 may communicate over network 105 to request a webpage, for example, from web client application server 114 of computing system 104. For example, client device 108 may be configured to execute application 109 to access content managed by web client application server 114. The content that is displayed to client device 108 may be transmitted from web client application server 114 to client device 108, and subsequently processed by application 109 for display through a graphical user interface (GUI) of client device 108.

Client device may include display 110. Examples of display 110 include, but are not limited to, computer displays, Light Emitting Diode (LED) displays, and so forth. Output or visualizations generated by application 109 can be displayed on display 110.

Functionality of sub-components illustrated within computing system 104 can be implemented in hardware, software, or some combination thereof. For example, software components may be collections of code or instructions stored on a media such as a non-transitory computer-readable medium (e.g., memory of computing system 104) that represent a series of machine instructions (e.g., program code) which implements one or more method operations. Such machine instructions may be the actual computer code the processor of computing system 104 interprets to implement the instructions or, alternatively, may be a higher level of coding of the instructions that is interpreted to obtain the actual computer code. The one or more software modules may also include one or more hardware components. Examples of components include processors, controllers, signal processors, neural network processors, and so forth.

Network 105 may be of any suitable type, including individual connections via the Internet, such as cellular or Wi-Fi networks. In some aspects, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some aspects, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Figure 1B:
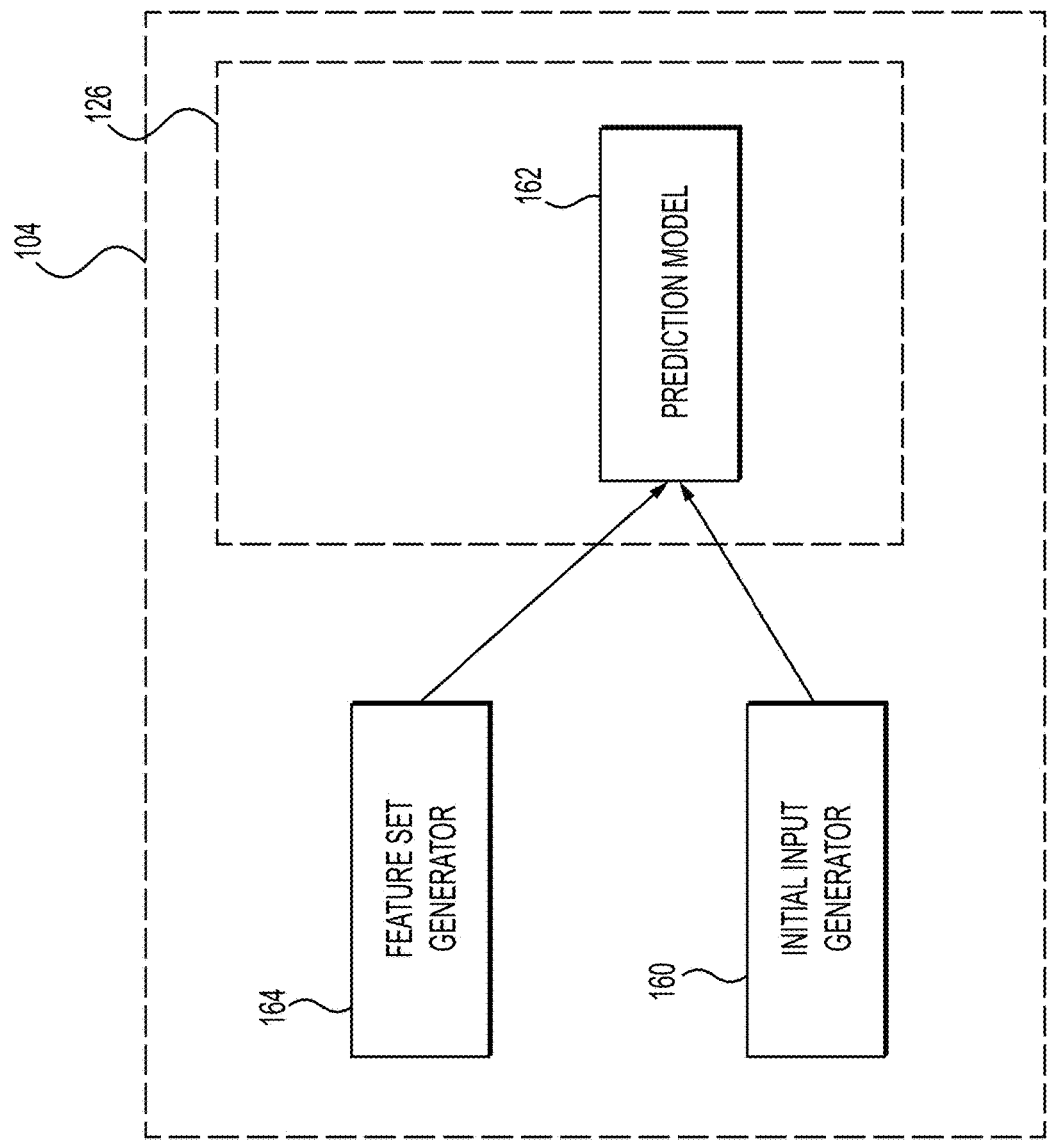
FIG. 1B is a block diagram of a prediction environment, in accordance with one or more embodiments.

FIG. 1B is a block diagram of a prediction environment 101, according to one or more embodiments. Prediction environment 101 may be configured to predict one or more sports related statistics. The prediction environment 101 may include an initial input generator 160, a feature set generator 164, and a prediction model 162. One or more of the modules (e.g., initial input generator 160, feature set generator 164, and prediction model 162) of the prediction environment 101 may be located within the computing system 104 of FIG. 1A. The prediction environment 101 may depict components and modules of computing system 104 described in FIG. 1A. One or more of the modules may be located on an external server accessed through network 105.

Each of the initial input generator 160, feature set generator 164, and prediction model 162 may include one or more software modules. The one or more software modules may be collections of code or instructions stored on a media (e.g., memory of organization computing system 104) which represent a series of machine instructions (e.g., program code) which implements one or more algorithmic steps. Such machine instructions may be the actual computer code that the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

The initial input generator 160 may include a tool or series of instructions to derive a data set (or initial set of data) to be used by a machine learning system (e.g., predictor 126) to generate an initial sports prediction. In an example, the initial set of data may include simple input data such as a player's and ball's location on a field, previous actions (e.g., pass, dribble), and historical information for one or more players on the opposing team (e.g., a goalkeeper's save percentage or an opposing tennis player's return rate). For example, an initial set of data relating to tennis may include the all player location data and ball location data and corresponding speed and acceleration data for all players and the ball. The player and ball location may be in the format of actual (e.g., global positioning coordinates) or grid coordinates relative to the playing field. The initial data set may further include the shot type and the previous shot type (i.e., forehand, backhand, volley) etc.

Figure 4A:
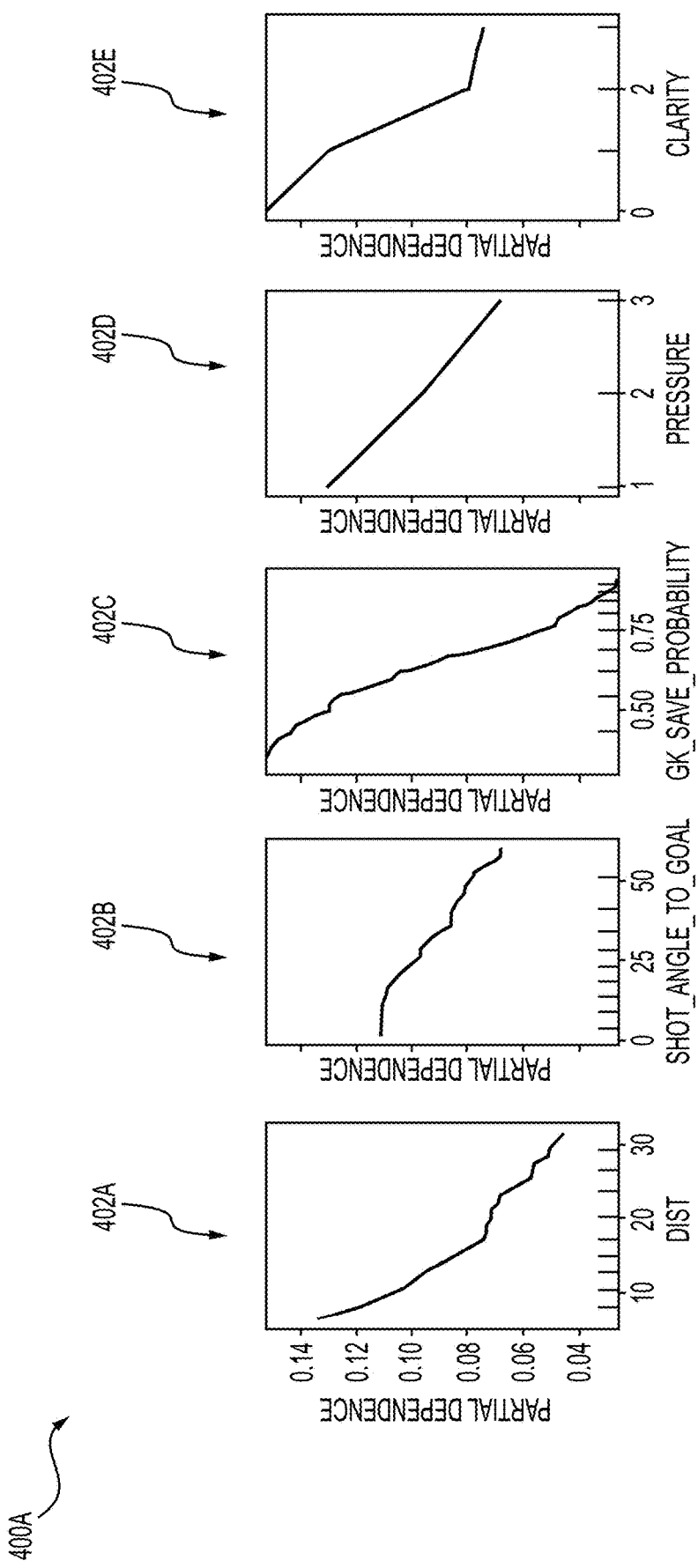
FIGS. 4A-4C illustrate representations of a goalkeeper save probability based on a shot location, in accordance with one or more embodiments.

The prediction model 162 may include a machine learning model configured to generate one or more sports predictions. The prediction model 162 can include a generative adversarial network (GAN) model with various monotonic constraints and weights to calibrate the model as described herein. In other examples, the prediction model 162 may be a transformer or any other type of machine learning model. The prediction model 162 may be configured to generate more accurate predictions in edge case scenarios in sporting events. The prediction model 162 may include a human-in-the-loop to tune the model. The prediction model 162 may be configured to update the value of respective weights so results fits within the desired behavior of a human expert (this could be a human, or could be set automatically). The prediction model 162 may not minimize a loss function, but rather have a desired output prediction space that the prediction model 162 is guided towards in order to address all the edge cases that tends to occur in a sport. The prediction model 162 may receive as an input, initial data through the initial input generator 160 and be configured to determine one or more predictions. The prediction model 162 may further have the determined predictions refined by incorporating additional feature data sets provided by the feature set generator 164 described below. The prediction model 162 may be updated (e.g., fine-tuned, modified, specialized, etc.) to make a variety of predictions. For example, the prediction model 162 may be configured to determine a prediction on whether a particular shot will be a goal (e.g., in soccer, hockey, basketball, handball, etc.). The prediction model 162 may further be configured to determine a point winner (e.g., in a tennis match a prediction of which player will win the point), a shot winner (e.g., the chances of the particular shot winning a point), a shot location, and/or a next shot trajectory (e.g., the shot impact locations, speed, spin and/or three dimensional position and time). The prediction model 162 can implement various software libraries (e.g., XGBoost) with monotonic constraints (e.g., as shown in FIG. 4A).

The prediction model 162 may be retrained with additional data. In some scenarios, the additional data may be edge/outlier scenarios in sporting events. The prediction model 162 may output adjusted weights that the prediction model 162 has learnt from the training data. The prediction model 162 may thus initially train on initial training data and learn initial model weights. Then the prediction model 162 may be trained on additional training data to address the edge-cases and then retrain the prediction model 162 with the updated training data and so on until convergence. Convergence may refer to when outputs are desired (e.g., accurate).

In soccer, the input of the expected goal save prediction model 162 can include event-based data containing information about exact striker and goalkeeper positions, proximity of defenders to the shot, and qualifiers about the shot and assist. The output can include a continuous value between 0-1 xG for all open-play and direct free kick shots. Penalties may be assigned a constant value (e.g., 0.7884) xG, and the output can exclude own goals. In an exemplary case, the prediction model 162 may have been trained on data from 800,000 shots from 49 competitions between 2018/19 to 2021/22 (including 9 women's competitions). The prediction model 162 may have been trained on 70% of the data, with 30% of the data utilized for testing a model.

Features of the prediction model 162 may include a distance of the goalkeeper and an offensive player (or the ball) and an offensive angle relative to the goalkeeper and/or the net. A goalkeeper save probability can be situational and determined separately for different scenarios. These scenarios may include a metric of a goalkeeper making a save given a distance of the ball to the goal or the goalkeeper, the position of the goalkeeper, and/or an angle between the ball and the goal or the goalkeeper.

In an example, there may be multiple prediction models 162. A separate prediction model 162 may be created with separate weights for different groupings of athletes with different statistics (e.g., for men's and women's sports; or based on skill level such as amateur, semi-professional, or professional). Further separate prediction models 162 may be generated for individual players and/or playing surfaces in a sport.

The feature set generator 164 may be configured to generate feature sets as described herein. For example, the feature set generator 164 can include a tool or instruction set capable of generating robust data relating to an action (e.g., the shot on goal or a return in tennis) and derive features as described herein. The features part of the feature set can be translated into values that can be used to modify a prediction generated by the prediction model 162. In some instances, each feature can be weighted to further increase the accuracy of a prediction. The feature set generator 164 may extract data from data store 118 of FIG. 1A.

The feature set generator 164 may generate features including, but not limited to, distance and angle of players relative to a goal or goalkeeper, a defender pressure (e.g., proximity of defending players near the goalkeeper), clarity (e.g., line of sight between the goalkeeper and the ball). Other example model features can include shot context (e.g., free kick, header, volley, first touch, one-on-one) and/or a previous action type (e.g., corner, throw-in, through ball, fast break, rebound).

FIG. 2 is a flow diagram of an exemplary method 200 for generating a probability for an action of a sporting event by implementing a feature set, according to one or more embodiments. The method 200 may be implemented by the environment 100 and prediction environment 101 described above in FIG. 1A and FIG. 1B.

At step 202, the method may include obtaining an initial set of data relating to an action of a sporting event, the initial set of data including at least a position of a first player on a field and a position of a target area on the surface (e.g., field, court, etc.). The initial data set may be obtained from the initial input generator 160. The position of the first player may refer to a player getting ready to strike a ball (e.g., a player attempting a shot). The target area may refer to a goal on a soccer field or an opponent's area of a tennis court. For example, the action may be a shot taken by an offensive player during a soccer match or a shot taken by a player in a tennis match.

In some instances, the initial set of data may include historical save probabilities for the defensive player. For example, the historical save probabilities can include previous save percentages for a goalkeeper during a prior game or season. The initial data my further include a tackle or shot block percentage for a defensive player in a soccer game. The historical save probability may further include a reply percentage for a player in a tennis over a past set, game, or match. The historical save probability may further be a forehand or backhand completion and win rate, or it could be how effective a player is in an edge-case shot such as a deep shot on the baseline or a drop-shot. This type of feature may capture the tendencies of players in unique moments.

At step 204, the method may include generating, by a machine learning model (e.g., prediction model 162), an initial projected scoring probability based on the initial set of data from step 202. In another example, the method may include generating an alternative prediction such as a projected shot location or trajectory of a shot as part of step 204 and/or in addition to step 204. The prediction may be a numerical output of a likelihood of success (e.g., see FIG. 3 which indicates a 0.74 output meaning a 74% likelihood of a goal occurring based on a shot). The initial prediction may solely be based upon the initial data provided. The machine learning model may include a GAN model, where the GAN model includes any of a set of monotonic constraints and a weight to each of the monotonic constraints. An example of the assigned weights may be as shown in FIG. 4A and discussed below.

At step 206, the method may include generating a feature set relating to the sporting event, the feature set being derived from any of a position of a second player on the field, and a distance and/or an angle between any of the first player, the second player, and the target area of the surface (e.g., field). The feature set may be generated by the feature set generator 164 of FIG. 1B. The second player may be on an opposing team from the first player in the sporting event. In an example, the second player may be a goalkeeper in a soccer game. The second player may be an opposing player in a tennis match.

The generated feature set may include a virtual line directed between the position of the first player and the position of the target area. The virtual line may be utilized to calculate angles of shots on goal relative to a goalkeeper's position. The feature set can be derived from any of a position of a defending player on the field, a distance and/or an angle between any of the defending player, the offensive player, and the goal, and a presence of any additional players within a proximity of the defending player, the offensive player, and the goal. The feature set may further include a shot trajectory (e.g., shot impact location, speed, spin or three-dimensional position, and time); three dimensional body-pose information of players (including skeleton positional information as well as racket location) current shot count (e.g., in tennis what hit in a volley); velocity and acceleration of players; court surfaces (e.g., in tennis); game contest (e.g., the score or rally count in tennis); the shot type (e.g., in tennis either the serve, return, forehand, backhand, smash, volley, or a tweener); temperature and wind information; time of day; and/or player attributes (e.g., skill rating at certain strikes such as serve, return, forehand, backhand quality ratings).

Figure 4B:
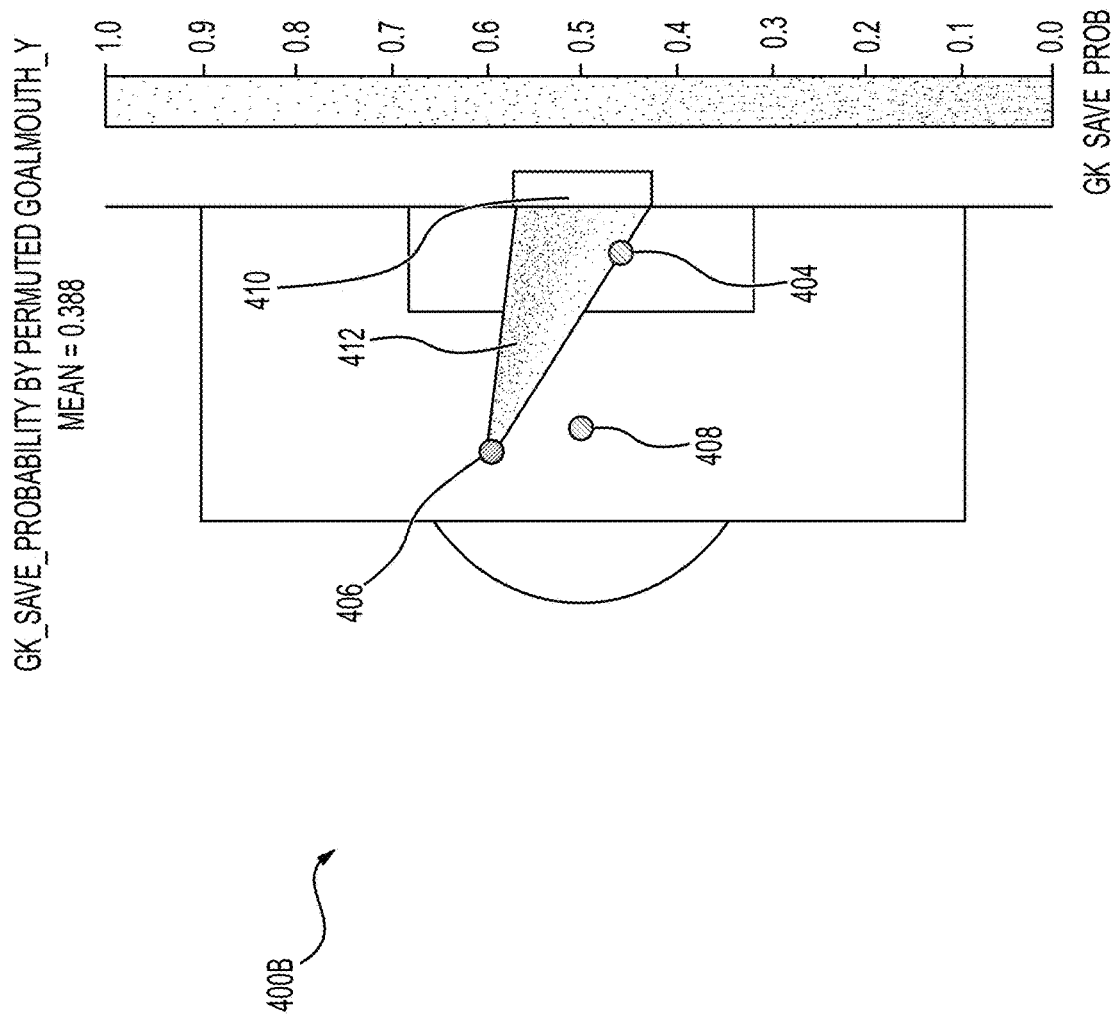

The feature set may further include a distance between the second player and an area of the virtual line. The feature set may include a second player save probability permutation modifying a save probability for each of a set of shot locations at different angles from the virtual line between the position of the first player and the position of the target area (e.g., as depicted in FIG. 4B). Example graphical representations of such features can be seen in FIGS. 4B-4C and 6A-6B. For instance, in FIG. 4C, it can be seen that a position of the goalkeeper 404 is away from a line of sight between the position of the offensive player 406 and the goal 410. As described in greater detail below, various factors, such as a distance of the goalkeeper from the striker line of sight or a position of any intervening player, can impact a predicted save probability for a given shot. For example, in a soccer game, the goal may be important information, so the virtual line may be created to captures the distance from the player/ball to the center of the goal. The virtual line may include the relative distance an angle between an offensive player and the defensive player so the goal's relative distance and angle is captured. Instead of using the center of the goal, the virtual line may be configured relative to a near post or far post so the system is aware of where the players are with respect to each respective goalpost. The virtual line may further be determined and implemented in Tennis uses cases. The virtual line may display the distance between a player relative to the baseline. This may be paired with metadata displaying where a shot was bounced relative to a baseline.

In some instances, the feature set may include a clarity value specifying a number of intervening players positioned within a proximity of the virtual line between the position of the offensive player and the position of the goal. For example, being within a proximity of the virtual line may be considered as within 1 feets, 3 feet, 5 feet, or 10 feet of distance of the virtual line. For instance, in FIG. 4C, an intervening player 408 can be positioned within a proximity of the offensive player 406 and the goal 410. Additional players within a proximity of the goalkeeper, striker, and the net can impact the projected goal save probability given a likelihood of the additional players screening vision of the goalkeeper, causing deflections of the shot, etc.

In some instances, the feature set may include a previous action type specifying a previous action performed prior to the occurrence of the action. Example previous action types in soccer can include a free kick, corner kick, throw-in, through ball, fast break, rebound, etc. Alternative example could include a serve, return, forehand, backhand, smash, volley, or a tweener in tennis.

In some instances, the feature set may include a shot archetype specifying a shot type, whether the shot is contested, a distance range of the shot, and/or whether the shot is from a central portion of the field or a lateral portion of the field. Other example shot archetypes can include, but are not limited to, long range kicks, open goal kicks (with feet or head), direct free kick, close range kicks, headers, etc. Alternative shot types may include serve, return, forehand, backhand, smash, volley, or a tweener when the sporting event is a tennis game.

At step 208, the method may include modifying, by the machine learning model (e.g. prediction model 162), the initial projected scoring probability from step 204 to an updated scoring probability by using the feature set. The updated save probability may incorporate the feature set information and provide a more accurate prediction. In particular, this prediction may be accurate for less occurring situations (e.g., when an opposing player is farther from a target area). The predicted outcome may be output from a prediction of 0 to 1, where 1 indicates an 100% chance of a prediction occurring (e.g., of scoring or winning a point) and a zero indicates a 0% chance of a prediction occurring. In alternative predictions, the system may be configured to output continuous predictions (see FIG. 14) along with gridded areas with corresponding percentage chance of a ball landing in a particular zone.

FIG. 3 through FIG. 12 as described below may describe aspects of method 200 and environment 100 as described above when applied to a soccer game. Particular aspects of the FIG. 3 through FIG. 12 description may be applied to sporting events other than soccer.

Figure 3:
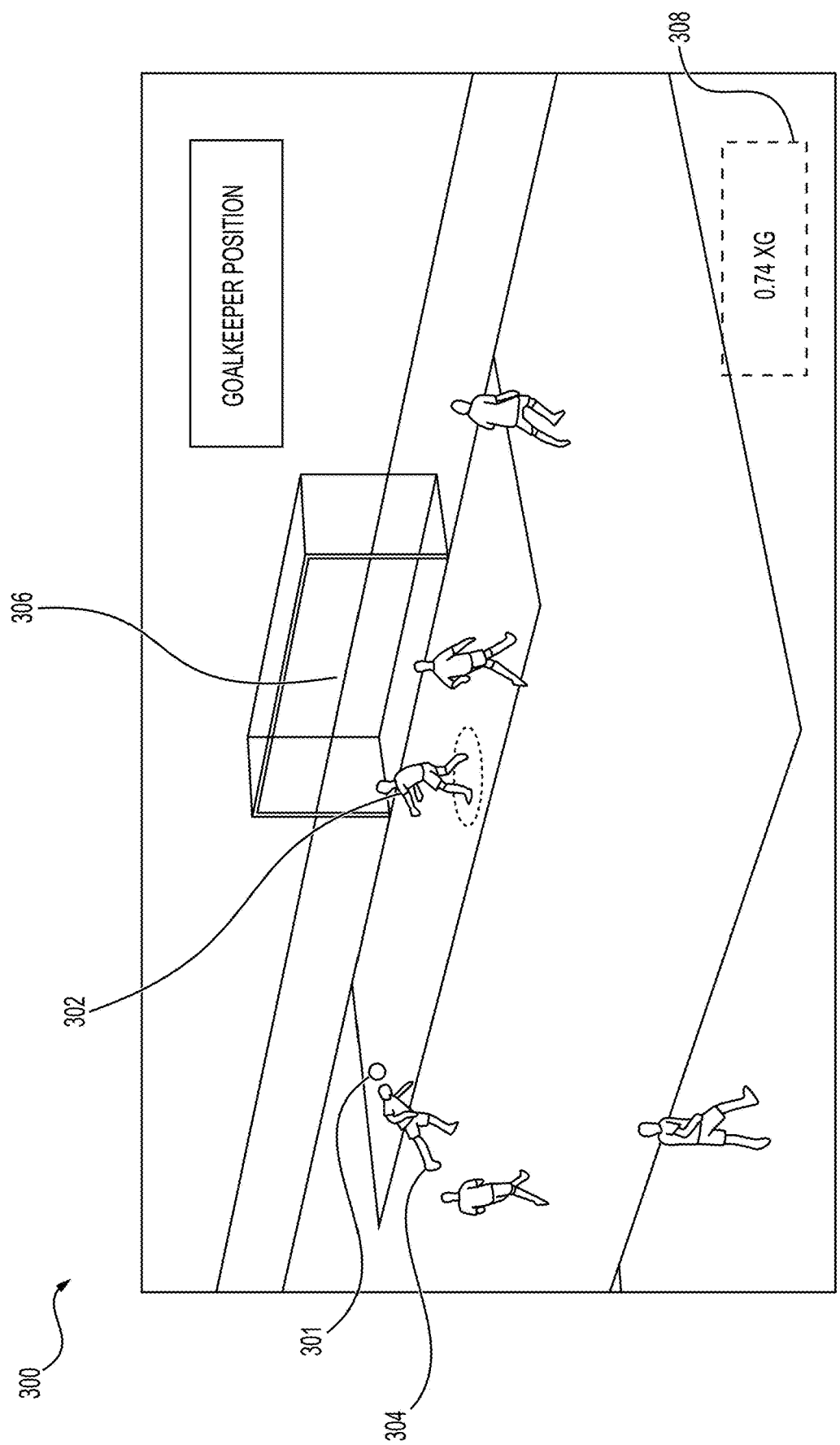
FIG. 3 depicts an example view of a goalkeeper and an offensive player in a soccer match, in accordance with one or more embodiments.

FIG. 3 depicts an example in game scenario 300 of a goalkeeper 302 and an offensive player 304 in a soccer match, according to example embodiments. The method 200 may have been applied to the game scenario 300 to determine an expected probability of a goal (xG) as the offensive player 304 attempts a shot. The prediction model (e.g., prediction model 162) may first receive initial data related to the offensive player 304's position, object 301 position, and/or the goal 306. An initial prediction may have occurred which is not shown. The system may further have received more granular information, and determined a feature set to provide to the prediction model. Utilizing the updated information, a prediction 308 indicating a 74% chance of a goal may be generated.

Figure 4C:
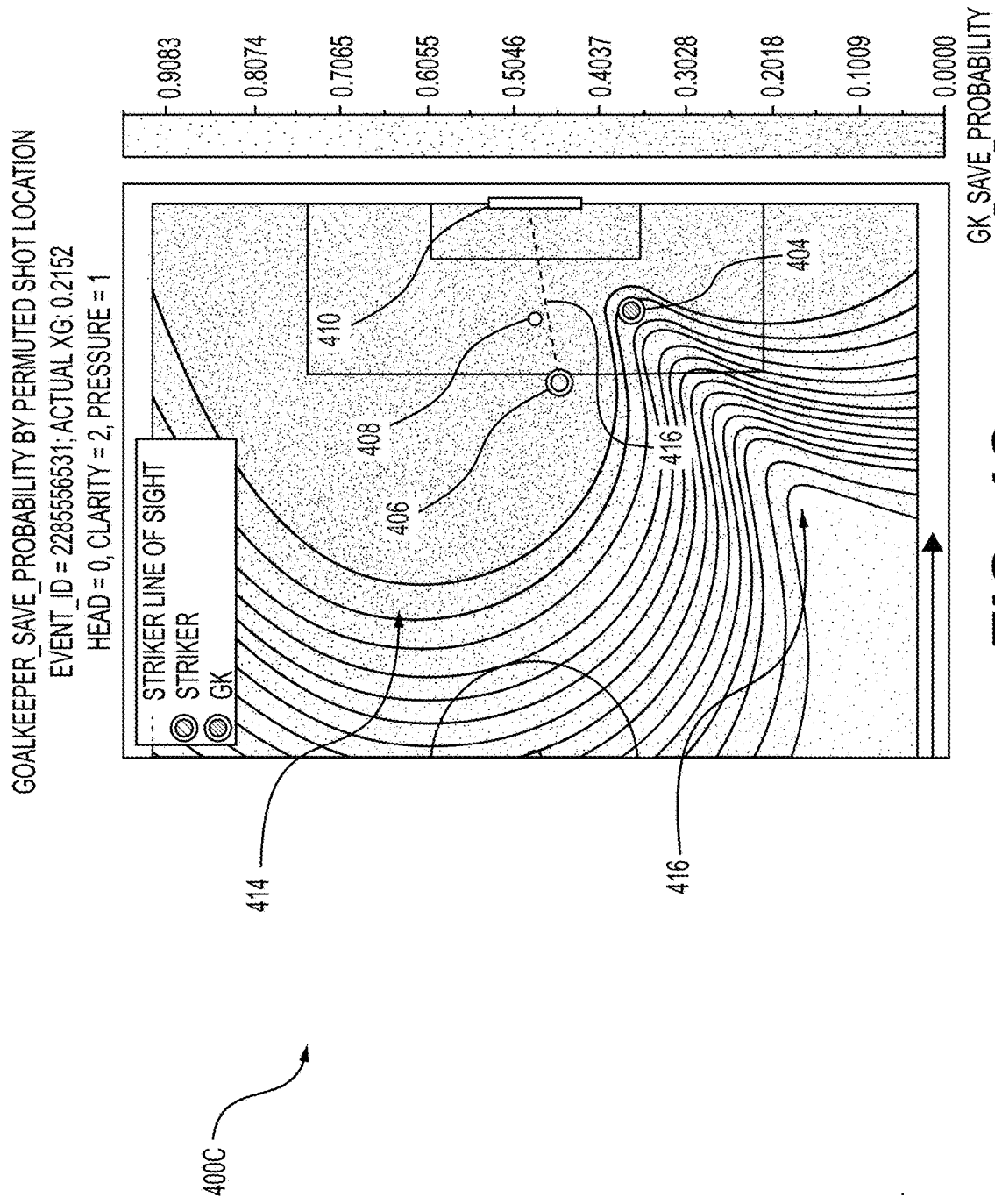

FIG. 4A depicts a graphical depiction 400A of a prediction model 162 monotonic constraints, according to example embodiments. FIG. 4B and FIG. 4C depicts graphical representations of projected save probabilities output by the prediction model 162 for an example scenario.

Examining FIG. 4A, 402A-E depict graphical models of monotonic constrains implemented by the prediction model 162. The graphs depict a partial dependence and various metrics relating to a shot on a goalkeeper. For example, graph 402A may depict how much dependences (e.g., how much weight) should a distance (e.g., a virtual line) and angle between an offensive player and the goal be given in a models prediction. The virtual line and angle may be assigned weights that are adjusted during calibration of the prediction model described herein. Further, representations 402B-E can illustrate various metrics (e.g., shot angle to goal, goalkeeper save probability, pressure, and/or clarity) mapped against a partial dependence applied by the prediction model.

A shot angle to goal can include an angle of the offensive player to a midpoint of a goal, as a higher angle of the ball from the goal can reduce a goal likelihood given a more difficult angle for the offensive player to strike the ball on goal. A goalkeeper save probability can include a probability of the goalkeeper to save any shot, or shots taken from a specific location on the field. A pressure can include a metric specifying a number of players within a distance of the goalkeeper. Further, a clarity can specify a line of sight between the goalkeeper and the ball, as intervening players between the goalkeeper and the ball can reduce vision of the goalkeeper.

FIG. 4B depicts a first representation 400B of a goalkeeper save probability with a permutation by projected shot location, according to example embodiments. As shown in FIG. 4B, the position of the goalkeeper 404, offensive player 406, and other player 408 can be derived relative to a goal 410. As noted above, the position of the goalkeeper relative to the goal and the ball can modify a likelihood of the goalkeeper making a save depending on a location of the shot. An output of the goalkeeper save probability that is permuted by the positions of the goalkeeper and the projected location of a shot may be shown in the output 412. As shown in output 412, a probability of the goalkeeper making a save can decrease as the shot is taken on goal further away from the goalkeeper's position.

FIG. 4C depicts a second representation 400C of the goalkeeper save probability with a permutation by shot location, according to example embodiments. As shown in FIG. 4C, the representation can illustrate a goalkeeper save probability based on a location of the offensive player 406. With the goalkeeper's 404 position being outside of the line of sight between the offensive player 406 and the goal 410, the save probability can be lower due to the position of the goalkeeper 404. Line 413 may visualize a distance to a goal 410 from offensive player 406. As shown in FIG. 4C, certain regions of the field (e.g., zone 414) may have higher goal probabilities as compared to other regions of the field (e.g., zone 416) at a similar distance to the goal 410 based on a goalkeeper's 404 position. This illustrates how the model (e.g., prediction model 162) recognizes, although a goalkeeper may farther from a goal 410, the goalkeeper may still be in a strong position to make a save (e.g., in zone 416) based on the offensive player's position. Further, it depicts how a player taking a shot from farther away (e.g., outside the box) (which may not traditionally have a high percentage chance of a goal), may have a great chance when a goalkeeper is farther from a goal and not in a line of sight between the player and goalkeeper.

According to embodiments disclosed herein, the outputs discussed herein (e.g., predictions, probabilities, likelihoods, etc.) may be used to output a recommended action. For example, a machine learning model may be trained to output a recommended action based on input data that includes one or more of the outputs discussed herein. Such a machine learning model may be trained using training data that includes one or more of historical or simulated game data, historical or simulated actions, historical or simulated player data, and/or the like. The trained version of the machine learning model may receive on or more outputs discussed herein and may output a recommended player action, formation, team action, and/or the like. As an example, the machine learning model may be provided a goalkeeper save probability for a shot from a first direction. Based on the save probability, the machine learning model may generate a recommended goalkeeper action to setup on a given area relative to goal posts to maximize the likelihood of a save. One or more recommended actions may be used to generate a visual depiction of the recommended action. The type of visual depiction may be dynamically determined based on the recommended action and may include one or more objects, players, etc., determined based on the recommended action (e.g., a graphic depicting where a goalkeeper should stand based on save probabilities and an initial penalty kick ball position).

Figure 5A:
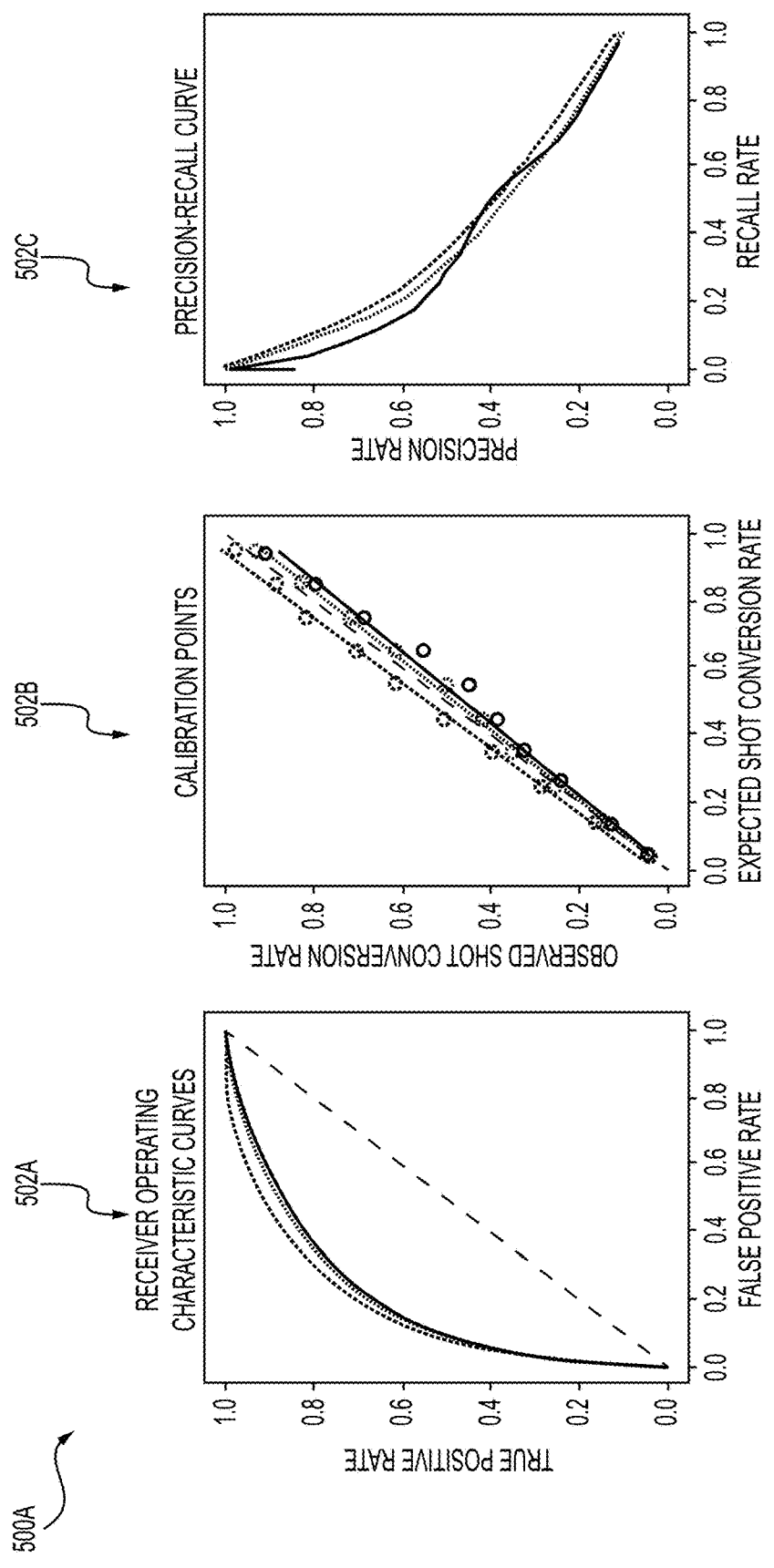
FIGS. 5A-5B illustrates graphical illustrations of a receiver operation characteristic curve, calibration points, precision-recall curve, and a log loss of a shot based on various shot positions, in accordance with one or more embodiments.

An exemplary performance of the prediction model 162 may be represented by of an area under a receiver operating characteristic curve (AUC-ROC) and a log loss score. FIG. 5A may depict graphs 500A of the receiving operating characteristic curves for one or more version of the prediction model 162. As shown in FIG. 5A, a first representation 502A can include a false positive rate based on a true positive rate and a receiver operating characteristic curve. Further, a second representation 502B can include an expected shot conversion rate based on an observed shot conversion rate and calibration points. A third representation 502C can include a recall rate based on precision rate and a precision-recall curve.

Figure 5B:
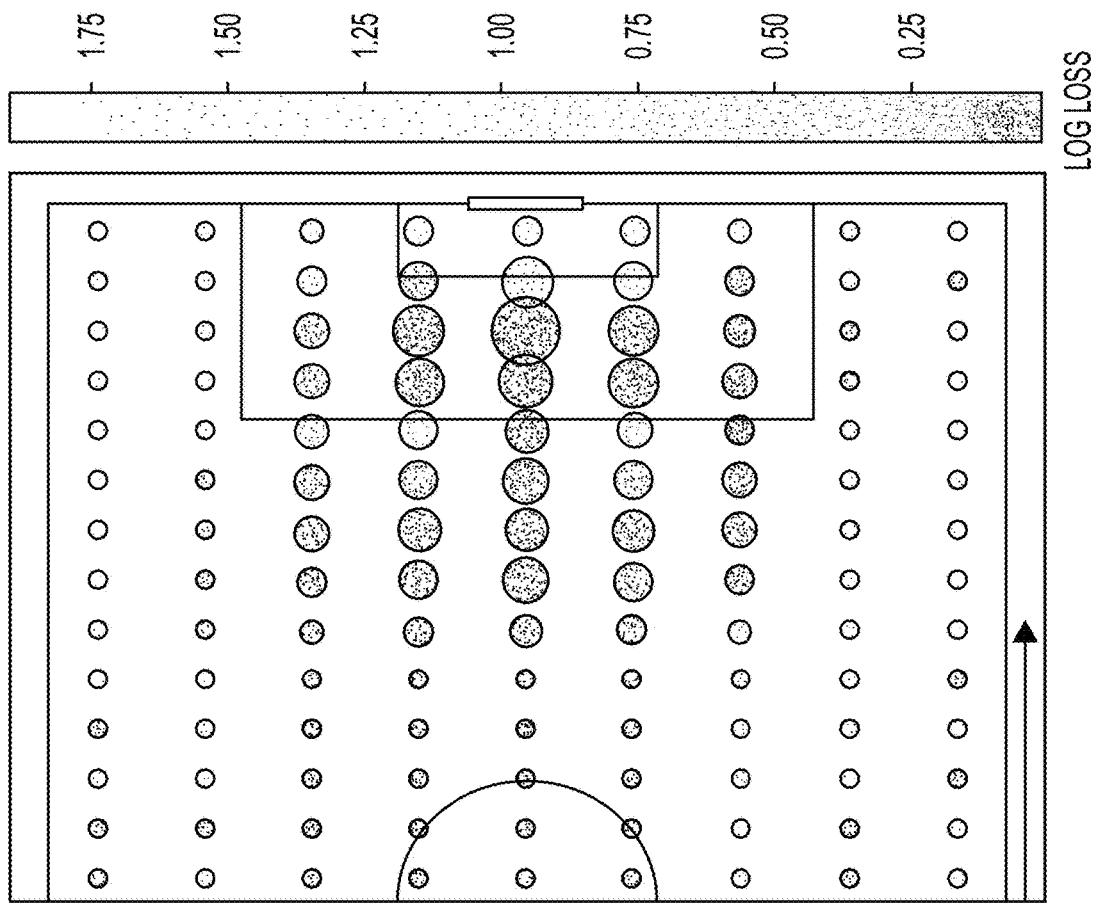

For example, performance of the model can include:
xG1: 0.80 AUC-ROC, 0.250 log loss
xG2.1: 0.84 AUC-ROC, 0.236 log loss
xG2.2: 0.81 AUC-ROC, 0.248 log loss Performance of the model may remain robust across various shot positions. FIG. 5B is a representation 500B of a log loss of a shots based on various shot positions. As shown in FIG. 5B, a log loss at various positions on the field can be indicative of a likelihood of goal scoring at various positions on the field. For example, the size of a circle indicator may correspond to the likelihood of goal scoring from a position corresponding to the circle indicator.

Further, the goal scoring metrics as described herein can be tracked based on various shot archetypes. Example shot archetypes can include headers, open goal shots, free kicks, long range shots, wide angle shots, etc. An example table with conversion rates and bias for each shot archetype is provided in Table 1.

TABLE 1

| archetype | n_shots | conversion rate | | | | bias per 1000 | | |
|---|---|---|---|---|---|---|---|---|
| | | obs | xG1 | xG2.1 | xG2.2 | xG1 | xG2.1 | xG2.2 |
| very long range (GK off line) | 74 | 0.09 | 0.04 | 0.02 | 0.12 | 53.3 | 70.0 | −21.3 |
| very long range (GK in goal) | 4,164 | 0.02 | 0.02 | 0.01 | 0.02 | 5.7 | 8.9 | 4.3 |
| open goal (head) | 127 | 0.77 | 0.60 | 0.68 | 0.80 | 176.5 | 93.7 | −29.9 |
| open goal (foot) | 2,712 | 0.80 | 0.56 | 0.69 | 0.81 | 233.1 | 106.3 | −9.8 |
| long range (wide) | 4,151 | 0.04 | 0.03 | 0.02 | 0.02 | 15.8 | 22.4 | 24.6 |
| long range (central) | 325,643 | 0.03 | 0.03 | 0.03 | 0.03 | −4.0 | 0.5 | 0.0 |
| direct free kick | 39,787 | 0.05 | 0.06 | 0.04 | 0.05 | −5.9 | 13.6 | 0.5 |
| close range (wide) | 106,624 | 0.10 | 0.13 | 0.10 | 0.10 | −29.9 | 3.2 | 1.4 |
| close range (very wide) | 12,100 | 0.07 | 0.11 | 0.10 | 0.07 | −42.3 | −27.0 | 0.8 |
| close range (central) | 418,459 | 0.15 | 0.15 | 0.13 | 0.14 | −5.4 | 20.0 | 0.3 |

Figure 6A:
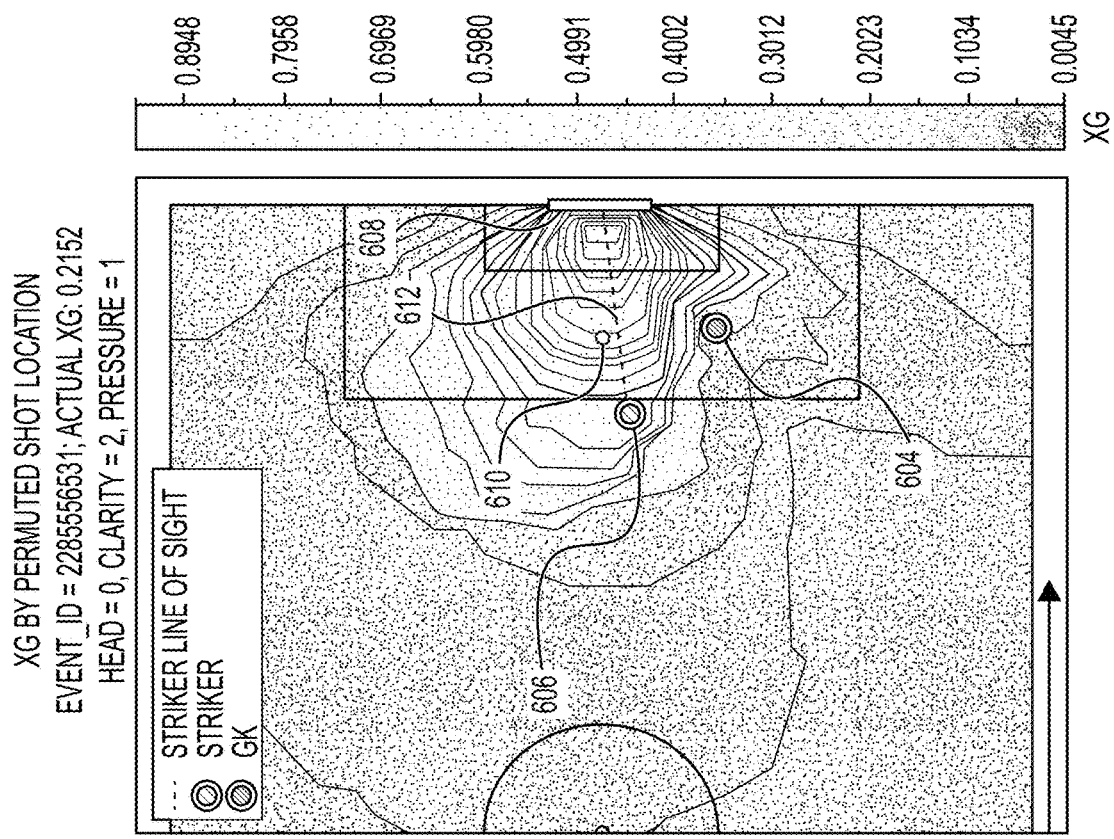
FIGS. 6A-6B illustrate example representations of metrics permuted by relative positions, in accordance with one or more embodiments.
Figure 6B:
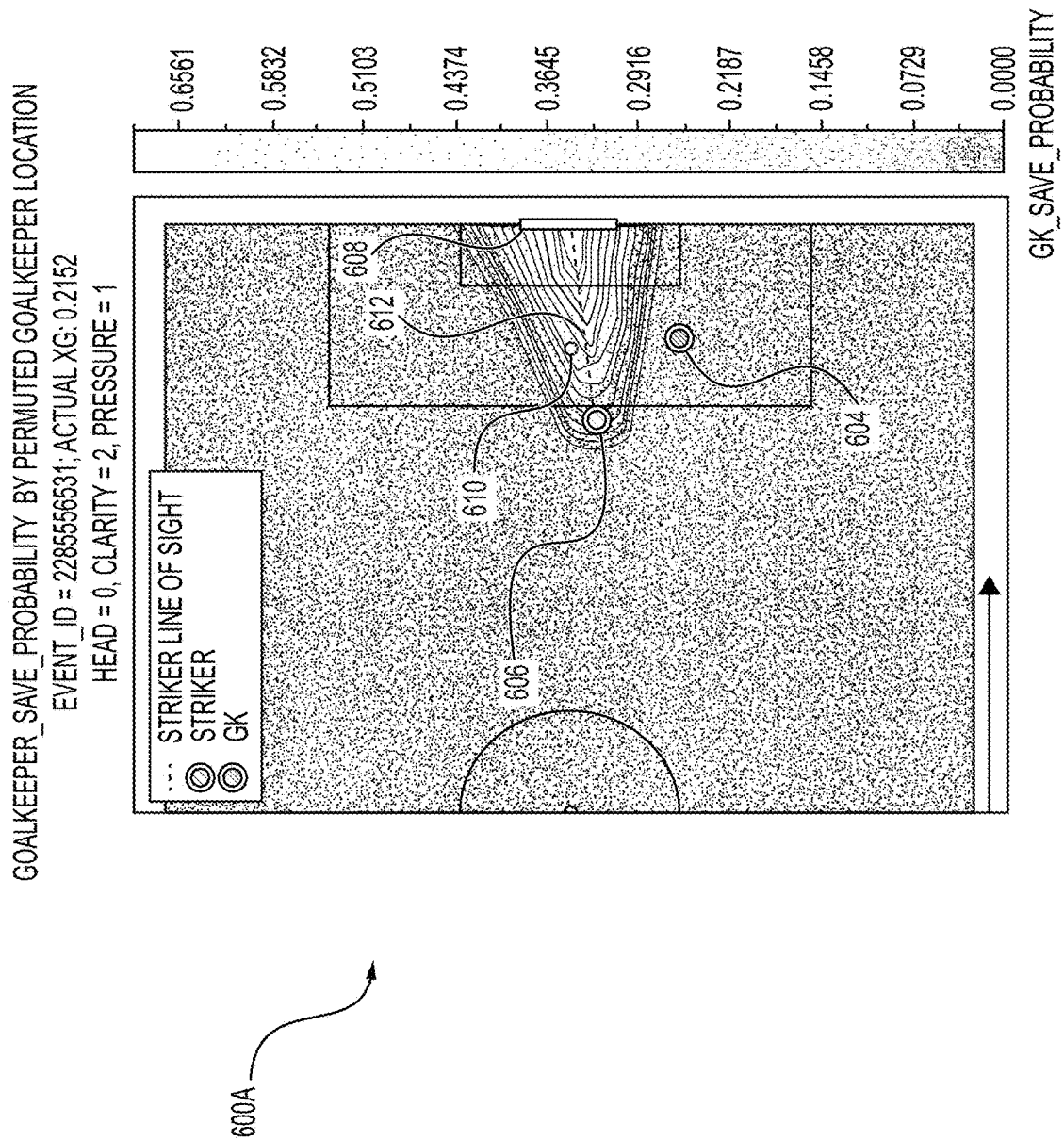

Further, the metrics of the prediction model 162 may be permuted using relative striker and/or goalkeeper positions. FIGS. 6A-6B illustrate example representations 600A-B of an xG metric permuted by relative striker and/or goalkeeper positions, according to example embodiments. The representations as shown in FIGS. 6A-6B can be used to evaluate optimality of both player when shooting and goalkeeper positioning when attempting to save a shot.

For instance, FIG. 6A illustrates a representation 600A of an xG metric (e.g., probability of a goal scored) by permuted shot locations. As shown in FIG. 6A, an xG metric can be based on the position of the goalkeeper 604, position of the striker 606, the goal 608, any other player 610, or a distance 612 between a striker 606 and the goal 608. As another example, FIG. 6B illustrates a representation of an xG metric permuted by a goalkeeper location. As shown in FIG. 6B, the position of the goalkeeper 604 relative to the angle between striker 606 and the goal 608 can predict a goal save probability based on projections of a shot being near the line of sight between striker 606 and the goal 608.

The prediction model 162 may be calibrated using past soccer season data. In some instances, the model (e.g., the prediction model 162) may be calibrated such that the total number of goals scored is closely approximated by the total xG for any large sample of shots, such as across a competition-season or a team-season. This can be called a prediction bias, or goals above expected. Calibration may include synthetically adding more examples around edge cases scenarios (e.g., training data for scenarios such as when a goal keeper is out of position). The calibration may include utilizing feedback from an outside source. For example, an outside source may not look at just one metric to calculates the total loss, but rather review many (i.e., what the outputs prediction space looks like on the pitch or court). Calibration may include data from all parts of a court/pitch/field, and if any parts spike and are overfits (e.g., different than expected outcomes which was generated or desired), then additional calibration may be performed with more training data of these scenarios.

Figure 7A:
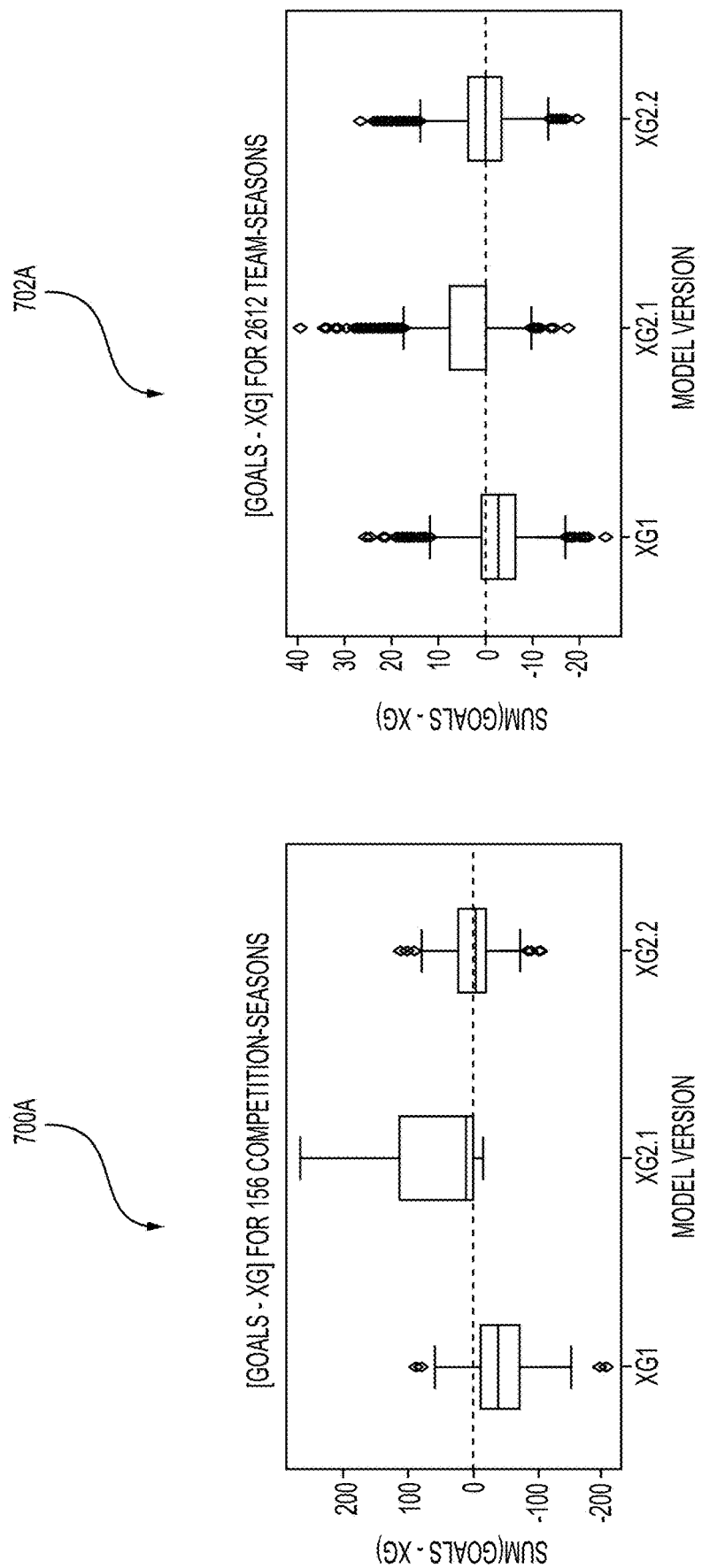
FIG. 7A-7B illustrate various representations of calibrating the model across multiple model versions, in accordance with one or more embodiments.
Figure 7B:
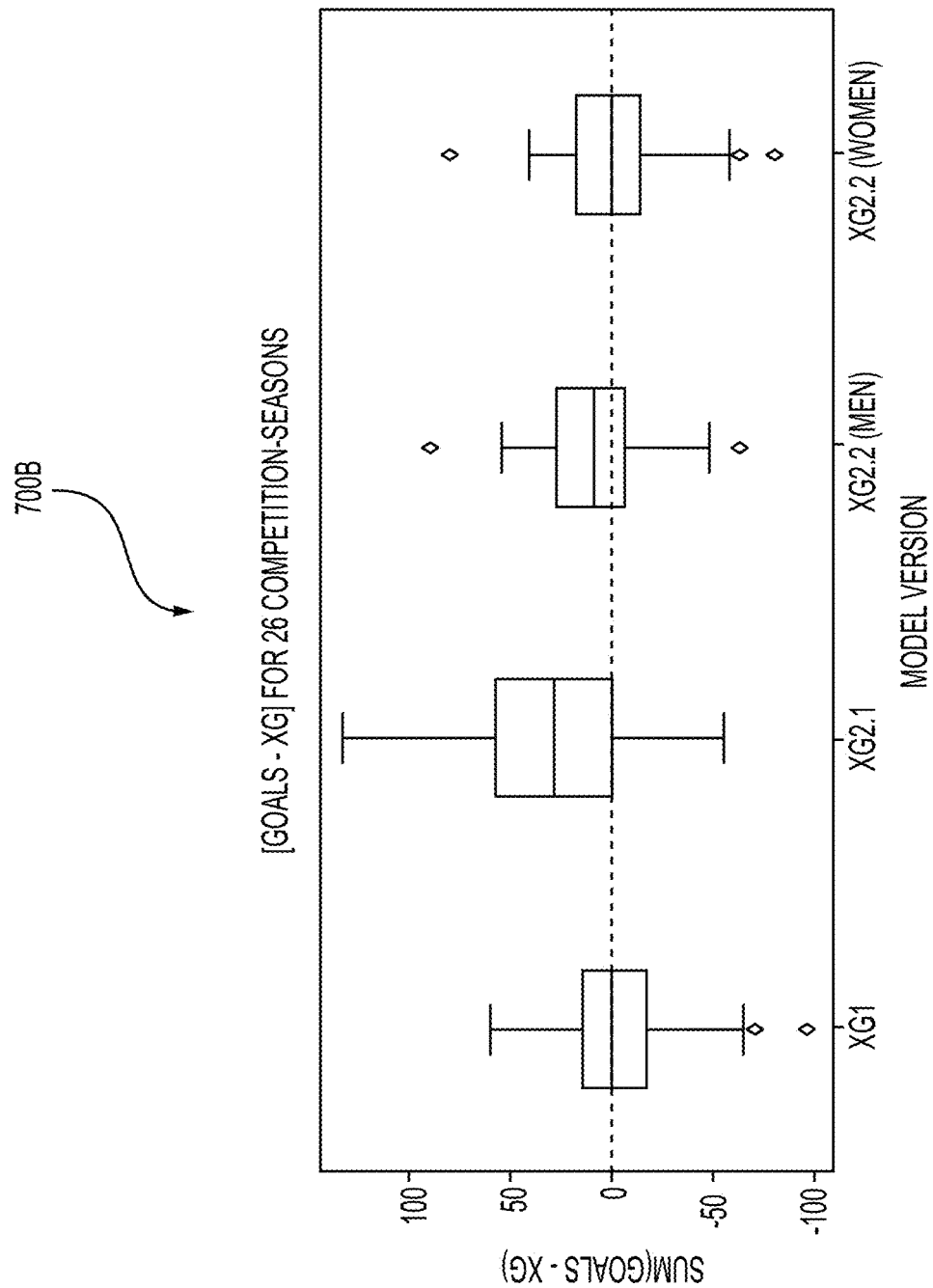

FIG. 7A-7B illustrate various representations 700A-B of calibrating the model (e.g., prediction model 162) across multiple model versions (e.g., XG1, XG2.1, XG2.2 (Men), and XG2.2 (women) representing updated models), according to example embodiments. FIG. 7A illustrates a first representation of the model for a competition season (e.g., 700A) and for a team-season (e.g., 702A). As shown in FIG. 7A, the model may be recalibrated as the model is updated to newer versions (e.g., as the prediction model is trained on additional training data)

Prediction bias may be similar across both men's and women's competitions. FIG. 7B illustrates a representation 700B of models that may be calibrated for women's competitions. Although noise within individual seasons can mean that sometimes predictions are a little high or a little low, prediction bias can center around zero (e.g., the median line in the box and whisker plots in FIGS. 7A-7B). For FIGS. 7A and 7B, the dotted line may represent the mean, the center of each box may be the median prediction, and the outline of the respective box represents the $25^{th}$ to $75^{th}$ percentile.

Figure 8:
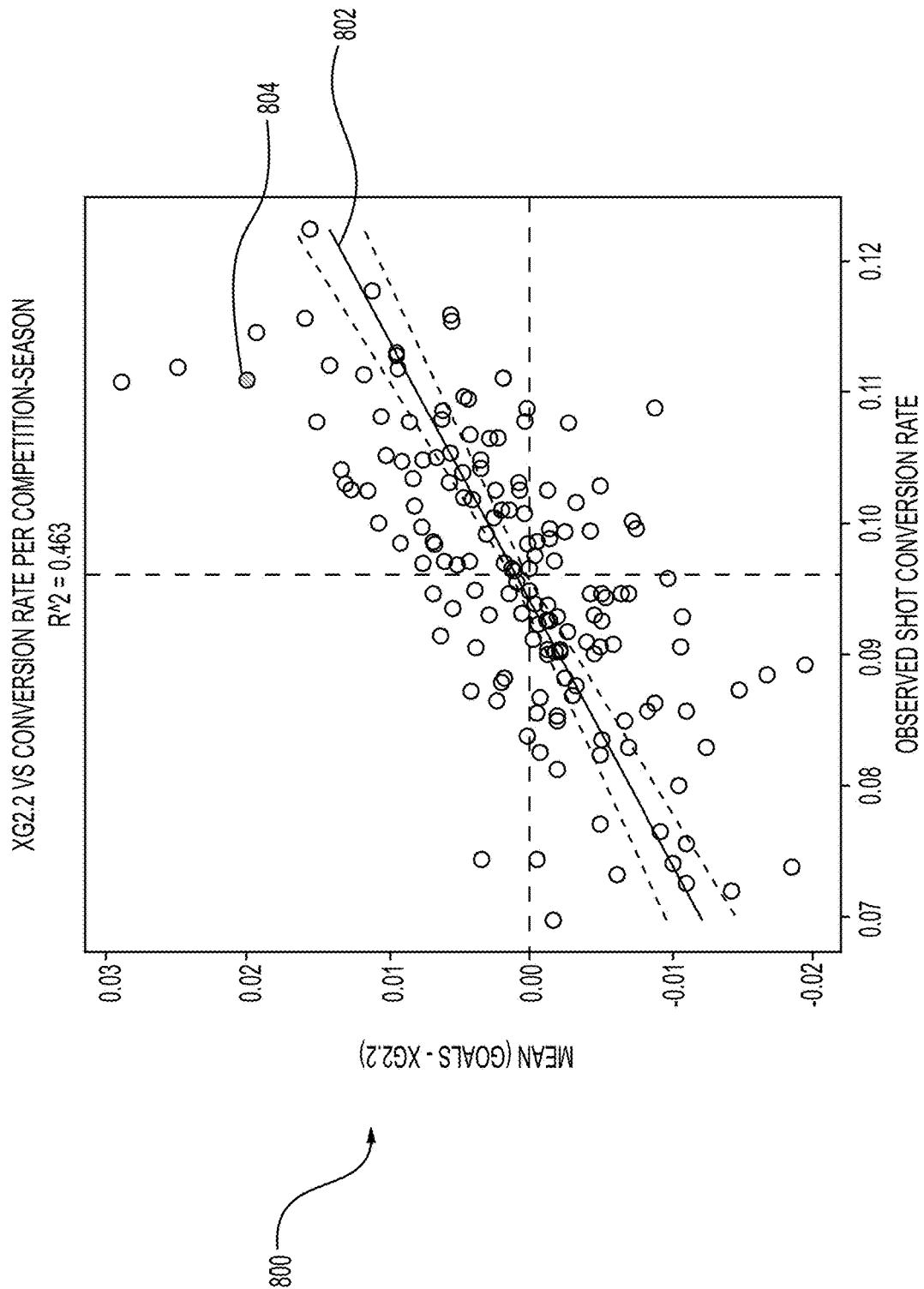
FIG. 8 is a graphical representation of a predicted goal save probability vs. an actual conversion rate for a competition-season for various teams, in accordance with one or more embodiments.

FIG. 8 is a graphical representation 800 of a predicted goal save probability vs. an actual conversion rate for a competition-season for various teams. As shown in FIG. 8, the graphical representation 800 can illustrate an observed shot conversion rate and a mean of a number of goals less the predicted goal save probability. FIG. 8 can provide a trend line 802 of conversion rates of various teams per a competition-season. Examining, a more extreme prediction bias value 804, includes a season where a soccer team took 4,632 shots and there were 515 goals observed with a predicted 422 xG, which represents an underprediction of 93 xG or 0.02 xG on average per shot.

Further, in this example, the xG bias can correlate with an observed shot conversion rate, explaining 46% of the total variation in bias. In this example, an under-predictive bias can be present when players convert more chances than expected, and vice versa. As an illustrative example, a first team can have one of the highest observed conversion rates of any competition-season, as illustrated by the value 804 in FIG. 8. The residual bias may equate to only 43 xG or 0.01 xG on average per shot. While the residual bias is still high, this may be a magnitude expected to see in only 1 in 10 competition-seasons.

The xG metric as described herein can be compared with a similar metric of another model implementing traditional approaches to generate predictions for a soccer tournament. The present xG metric can have aggregations similar to that of a different model. The performance of the xG generated using the model as described herein can be both more accurate and less biased than the other metric across all shots in the competition and within specific shot archetypes. Table 2 illustrates example conversion rates and bias within specific shot archetypes:

TABLE 2

| archetype | n_shots | conversion rate | | | bias per 1000 | |
| --- | --- | --- | --- | --- | --- | --- |
| | | obs | xG2.2 | competitor | xG2.2 | competitor |
| header (uncontested) | 96 | 0.16 | 0.14 | 0.12 | 14.3 | 36.2 |
| header (contested) | 159 | 0.08 | 0.09 | 0.10 | −5.3 | −11.9 |
| close range (central) | 577 | 0.20 | 0.19 | 0.18 | 12.6 | 26.6 |
| close range (wide) | 309 | 0.12 | 0.12 | 0.12 | 1.6 | 2.1 |
| long range (central) | 294 | 0.03 | 0.04 | 0.04 | −5.6 | −6.5 |
| long range (wide) | 246 | 0.02 | 0.02 | 0.02 | 0.1 | 1.9 |

For example, an xG metric from a model (e.g., prediction model 162) as described herein (e.g., also referred to as "xG2.2") can have a log loss=0.267 and a bias=4.9 goals above expected. In this example, the other metric can have a log loss=0.273 and a bias=13.7 goals above expected. The results may show the improved results of the model and approaches described herein.

Figure 9:
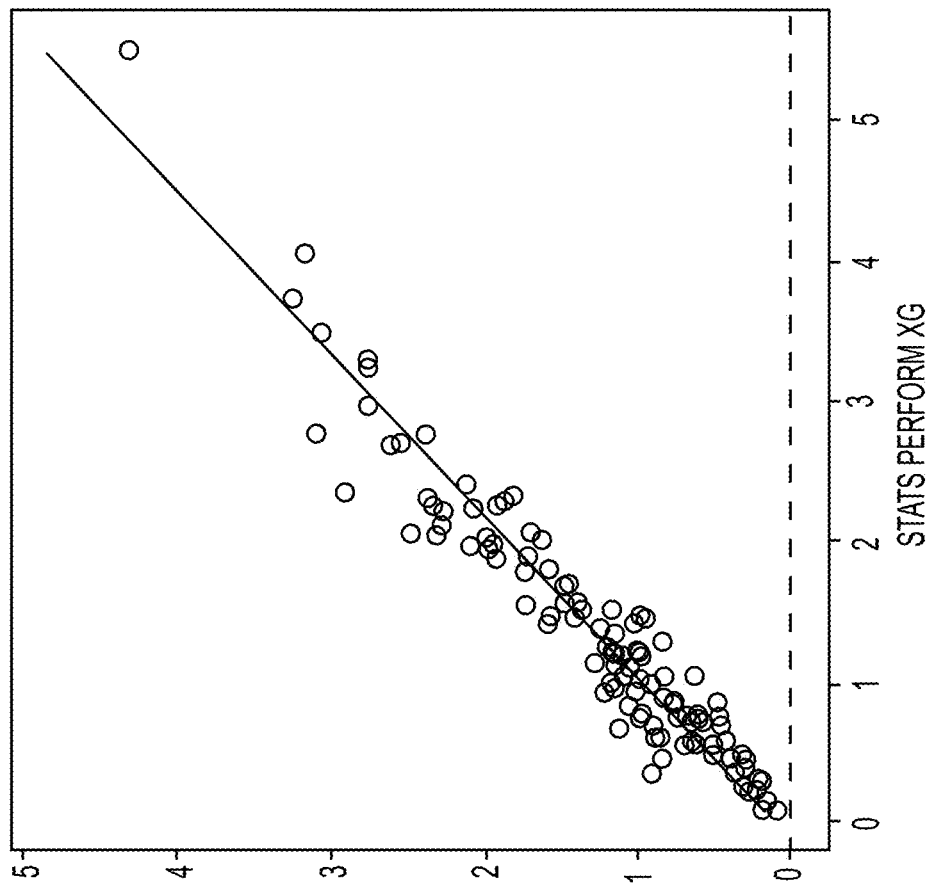
FIG. 9 is a graphical illustration of comparing metrics, in accordance with one or more embodiments.

FIG. 9 is a graphical illustration of an xG metric derived as described herein against one or more of the other metrics described above, according to example embodiments. As shown in FIG. 9, the graph 900 can illustrate the increased performance of the xG as derived herein against an xG from another model for a specific tournament.

Figure 10A:
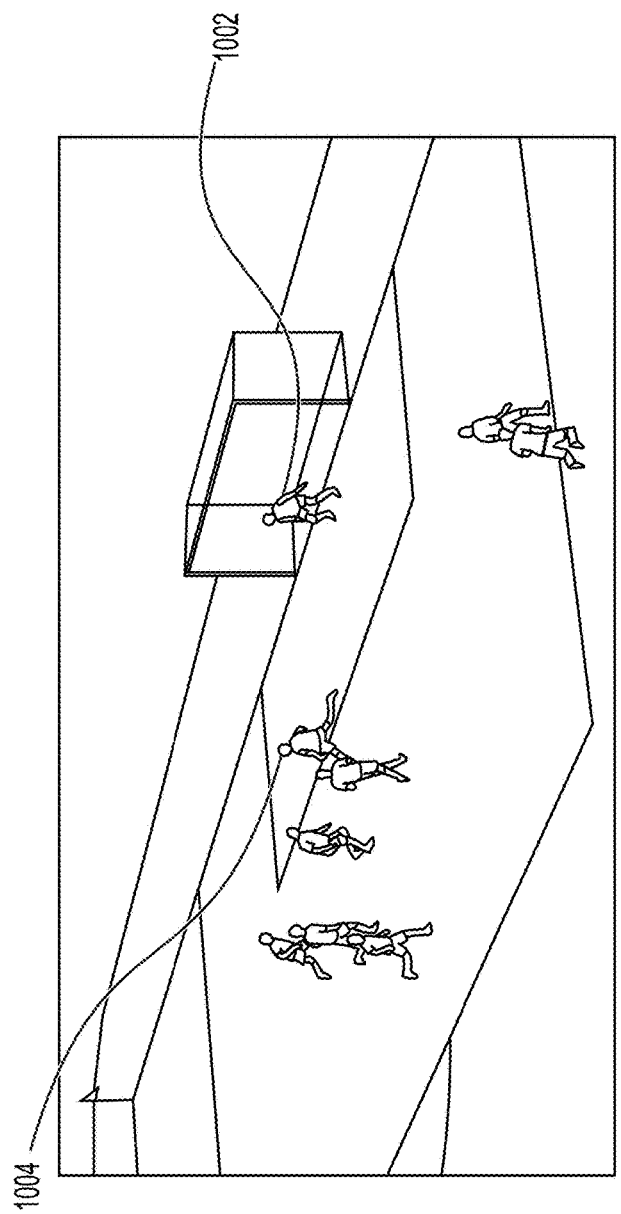
FIGS. 10A-10B illustrate an example view of a shot and a plot specific to the shot, according to example embodiments.
Figure 10B:
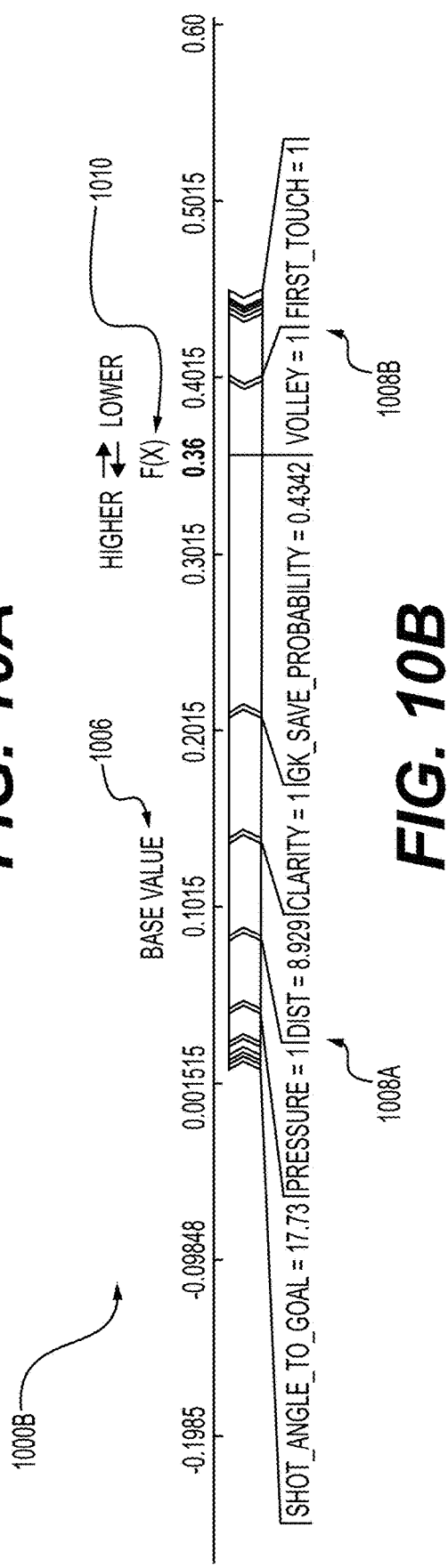

In some embodiments, an interpretable prediction explanation can include a Shapley Additive Explanations (SHAP) plot to provide human-interpretable explanation for any individual shot prediction. FIGS. 10A-10B illustrate example views (e.g., FIG. 10A) of a shot, and a plot (e.g., FIG. 10B) specific to the shot, according to example embodiments. As shown in image 1000 of FIG. 10A, the position of the goalkeeper 1002, the striker 1004, etc. can be tracked and determined relative to the field.

Further, the plot in FIG. 10B (e.g., 1000B) can illustrate a base value for the xG metric 1006. The base value can be modified based on individual features which increase (e.g., 1008A) or decrease (1008B) the modelled probability of scoring, which in this case may be 0.36 xG (e.g., final value 1010).

For instance, a relatively low goalkeeper save probability for a shot from this position (about 43%), a short distance (about 9 m), and unobstructed view of goal (clarity=1, pressure=1) all act to increase xG. The fact that the shot is both a volley and the first touch by the striker may negatively contribute to xG.

Figure 11A:
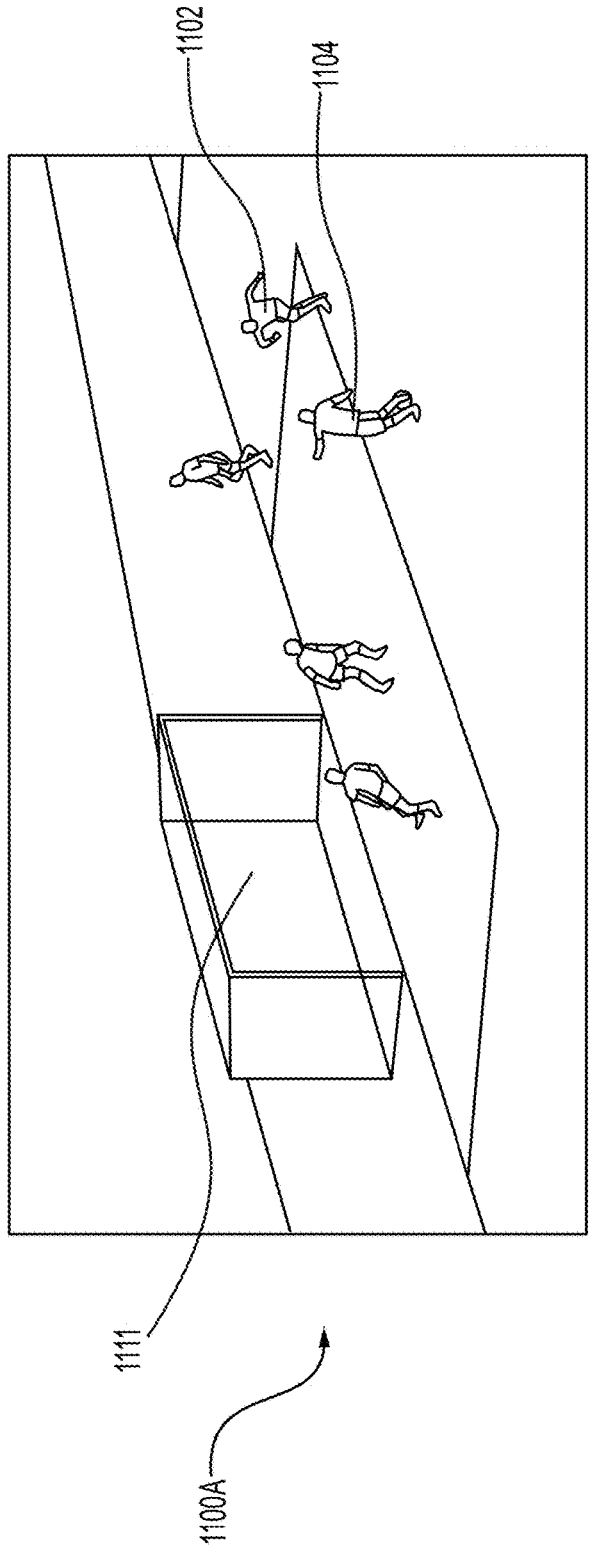
FIGS. 11A-11B illustrate an example view of a shot and a plot specific to the shot, in accordance with one or more embodiments.
Figure 11B:
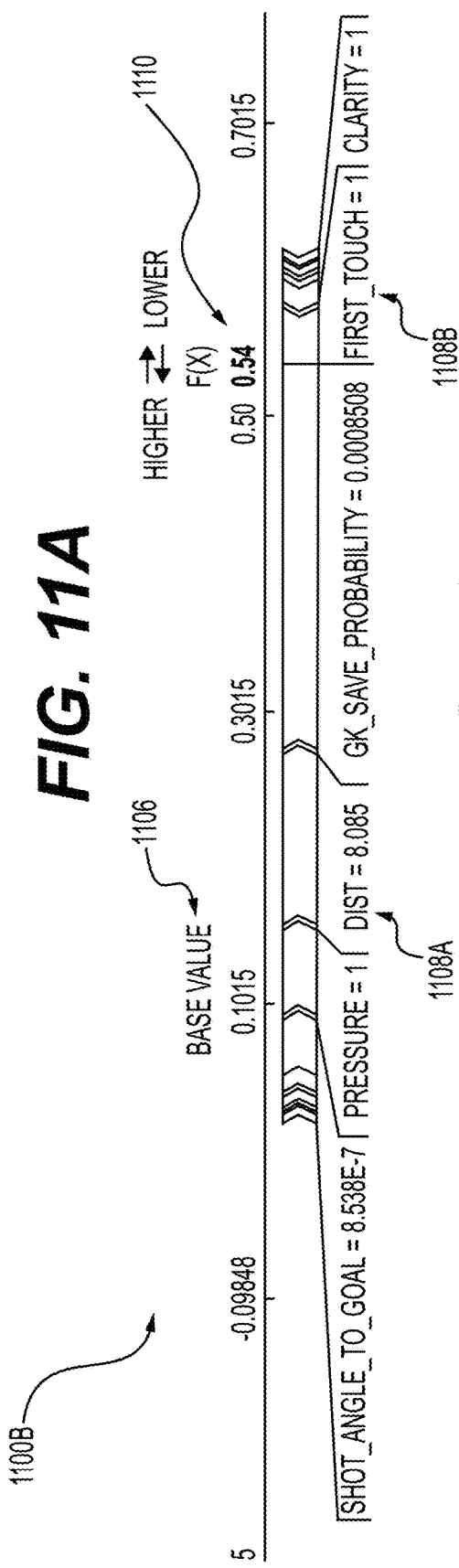

FIGS. 11A-11B illustrate an example view (e.g., image 1100A of FIG. 11A) of a shot, and a plot (e.g., FIG. 11B) specific to the shot, according to example embodiments. As shown in FIG. 11A, the position of the goalkeeper 1102, the striker 1104, etc. can be tracked and determined relative to the field, with the goalkeeper 1102 well out of position from the striker 1104 and the goal 1111.

Further, the plot in FIG. 11B (e.g., 1100B) can illustrate a base value for the xG metric 1106. The base value can be modified based on individual features which increase (e.g., 1108A) or decrease (1108B) the modelled probability of scoring, which can be 0.54 xG (e.g., final value 1110). In this example, there can be a very low goalkeeper save probability (<0.01%) and short distance (about 8 m) that contribute most positively to xG. The fact that the shot is a first touch and relatively obstructed by defenders (clarity=2) can provide a small negative contribution.

Figure 12:
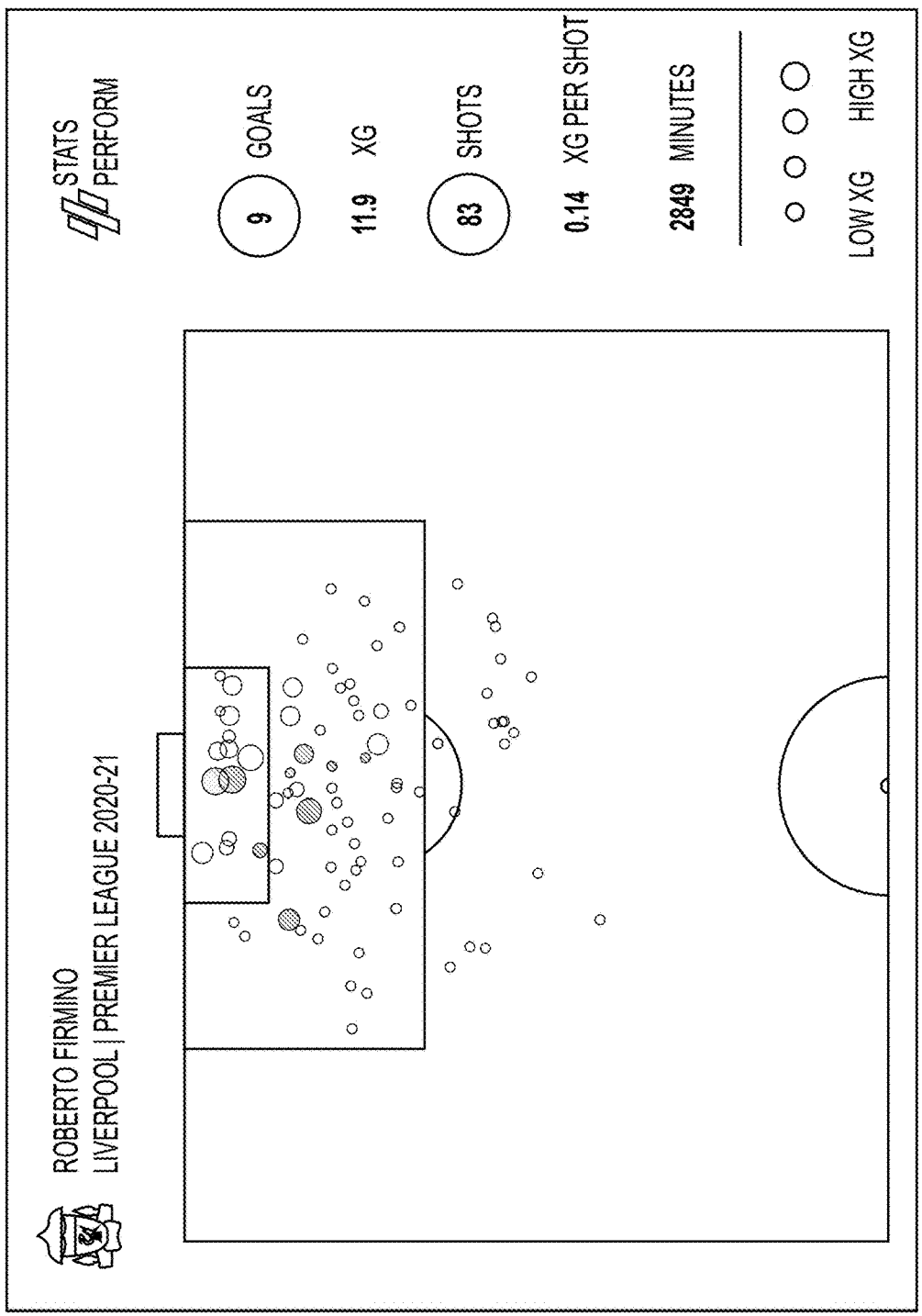
FIG. 12 illustrates an example shot map, in accordance with one or more embodiments.

Other example outputs can include an xG shot map, goals above xG, a shooting value added (i.e., xGoT−xG), a goalkeeper positioning optimality, etc. FIG. 12 illustrates an example xG shot map 1200A. As shown in FIG. 12, a plotting of shots in the shot map 1200 can illustrate goals off of a total number of shots, with an xG per shot.

Table 3 below illustrates an example table mapping goals about or above xG for a soccer league:

TABLE 3

| | player | xG | goals | shots | goals_above_xG |
| --- | --- | --- | --- | --- | --- |
| 0 | Erling Haaland | 16.77655 | 23.00000 | 79.00000 | 6.22345 |
| 1 | James Maddison | 3.79412 | 9.00000 | 51.00000 | 5.20588 |
| 2 | Gabriel Martinelli | 6.08841 | 11.00000 | 58.00000 | 4.91159 |
| 3 | Harry Kane | 11.16631 | 16.00000 | 86.00000 | 4.83369 |
| 4 | Marcus Rashford | 9.53738 | 14.00000 | 66.00000 | 4.46262 |
| 425 | Mohamed Salah | 11.79740 | 9.00000 | 75.00000 | −2.79740 |
| 426 | Eddie Nketiah | 7.19006 | 4.00000 | 40.00000 | −3.19006 |
| 427 | Darwin Núñez | 9.29937 | 6.00000 | 71.00000 | −3.299837 |
| 428 | Danny Welbeck | 4.40669 | 1.00000 | 32.00000 | −3.40669 |
| 429 | Patrick Bamford | 4.60252 | 1.00000 | 27.00000 | −3.60252 |

Figure 13:
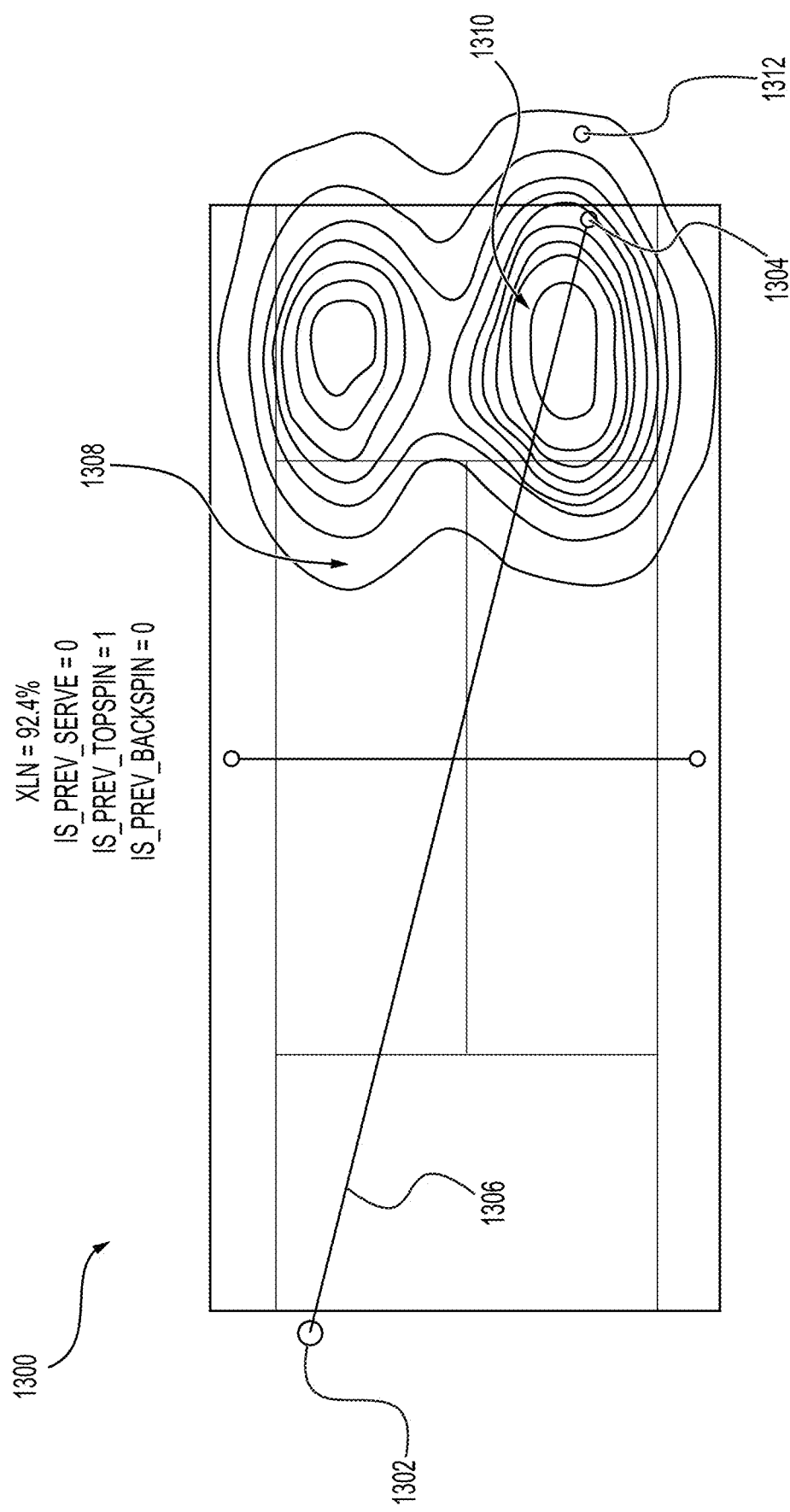
FIG. 13 is an exemplary heatmap output of a projected shot, in accordance with one or more embodiments.
Figure 14:
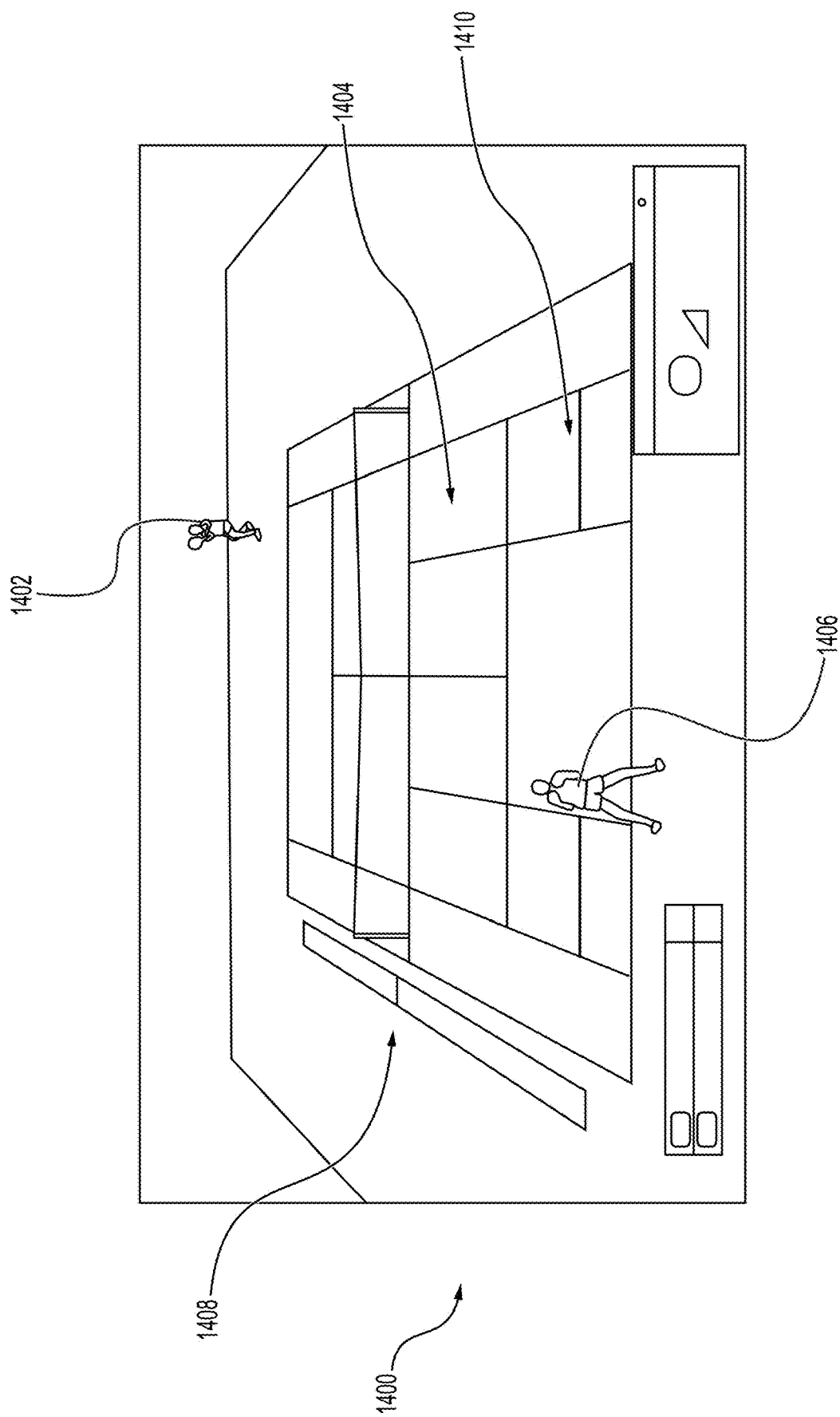
FIG. 14 depicts an exemplary output of the prediction model when applied to an exemplary tennis game, in accordance with one or more embodiments.

FIGS. 13 and 14, as described below, may illustrate aspects of method 200 and environment 100 as described above when applied to tennis. When applying the prediction model 162 to tennis, input features that may be utilized may include: a shot trajectory (e.g., shot impact location, speed, spin or three-dimensional position, and time); position of players (e.g., the three dimensional location of all players); current shot count (e.g., in tennis what hit in a volley); velocity and acceleration of players; court surfaces (e.g., in tennis); game contest (e.g., the score or rally count in tennis); the shot type (e.g., in tennis either the serve, return, forehand, backhand, smash, volley, or a tweener); temperature and wind information; time of day; and/or player attributes (e.g., skill rating at certain strikes such as serve, return, forehand, backhand quality ratings). The prediction model 162 may predict outputs such as the next point winner, next shot winner, shot location, and/or next shot trajectory.

FIG. 13 is an exemplary heatmap output 1300 from the prediction model (e.g., prediction model 162), according to one or more embodiments. The prediction output may be a projected location of a shot. The output 1300 may include a position of a player 1302 striking a tennis ball, the location 1304 from which the previous shot was taken, and the corresponding path 1306 the ball took prior. The prediction model may further include location information on the target area 1308 and, within the target area 1308 project a heatmap prediction 1310 depicting the likelihood a shot's landing location. The prediction model may incorporate any of the feature set described above, including the opposing team player's location 1312 to help predict the shot location. Additional feature set information may include that the previous shot was not a serve, that the previous shot had topspin, and that the previous shot did not have backspin. The XLN may refer to the shot landing within the court boundaries. Conversely, in this example, x_out would be 7.6%. The model may predict additional outputs such as the location of each zone, or the location on winning the point.

FIG. 14 may depict an exemplary output 1400 of the prediction model 162 when applied to an exemplary tennis game, according to one or more embodiments. For example, during a tennis game, a first player 1402 may be striking a tennis ball aiming for a target area 1404 of the court. The prediction model 162 may incorporate various feature data, in addition to initial data, to generate one or more predictions. The data may include a location of a second player 1406 on the opposing team. For example, the model may output a constant prediction 1408 of how likely each player is to win a particular point. This prediction 1408 may update with each hit in a rally. The model may further predict, for one or more grid sections 1410 of the target area 1404, a particular probability that the shot will land in the respective grid section.

Neural Network Training and Computing System Overview

Figure 15:
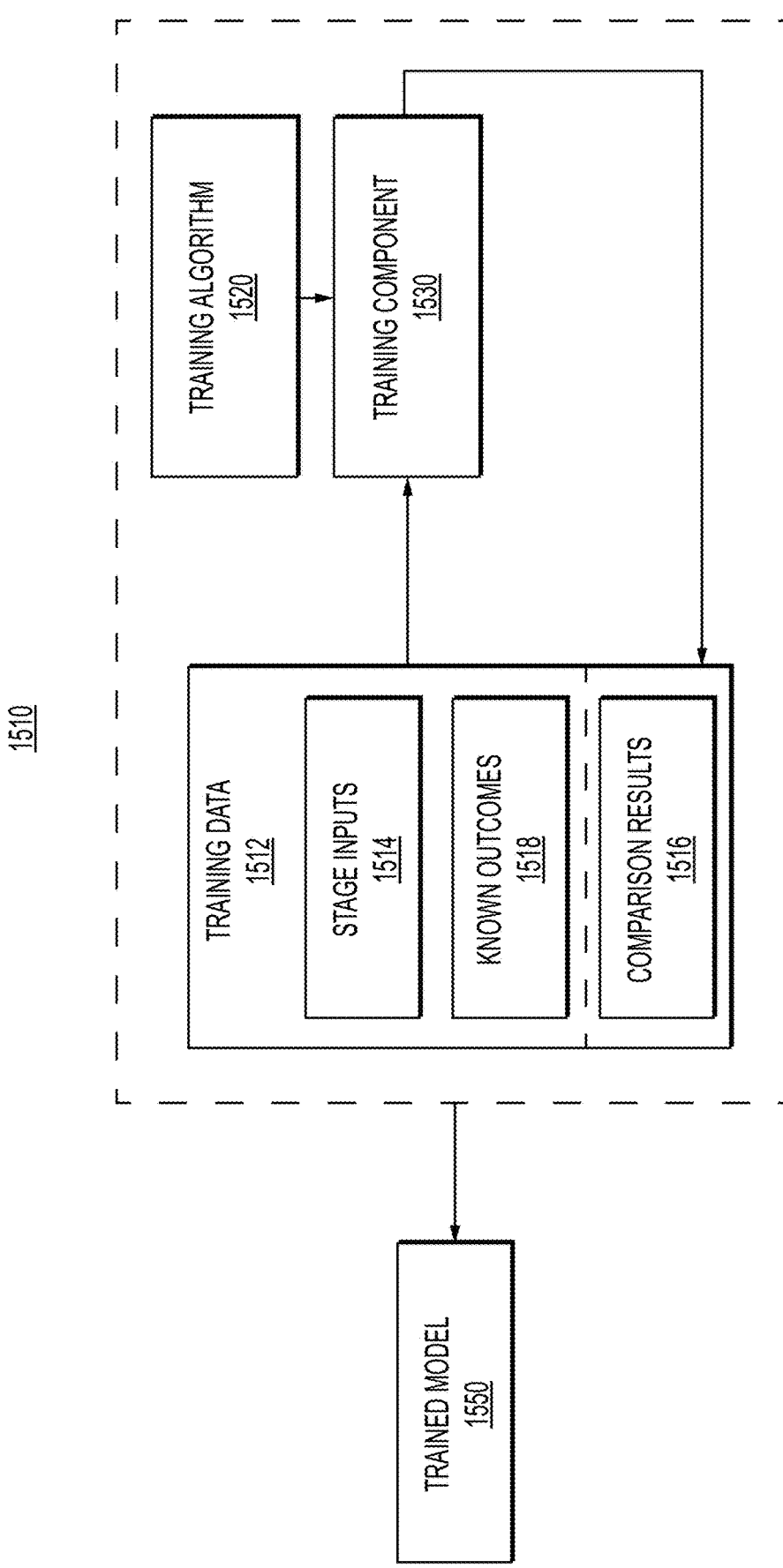
FIG. 15 depicts a flow diagram for training a machine learning model, in accordance with one or more embodiments.

FIG. 15 depicts a flow diagram for training a machine learning model, in accordance with an aspect. As shown in flowchart 1510 of FIG. 15, training data 1512 may include one or more of stage inputs 1514 and known outcomes 1518 related to a machine learning model to be trained. The stage inputs 1514 may be from any applicable source including a component or set shown in the figures provided herein. The known outcomes 1518 may be included for machine learning models generated based on supervised or semi-supervised training. An unsupervised machine learning model might not be trained using known outcomes 1518. Known outcomes 1518 may include known or desired outputs for future inputs similar to or in the same category as stage inputs 1514 that do not have corresponding known outputs.

The training data 1512 and a training algorithm 1520 may be provided to a training component 1530 that may apply the training data 1512 to the training algorithm 1520 to generate a trained machine learning model 1550. According to an implementation, the training component 1530 may be provided comparison results 1516 that compare a previous output of the corresponding machine learning model to apply the previous result to re-train the machine learning model. The comparison results 1516 may be used by the training component 1530 to update the corresponding machine learning model. The training algorithm 1520 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flowchart 1510 may be a trained machine learning model 1550.

A machine learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine learning model (e.g., a trained model) based on the training. Once trained, the machine learning model may output machine learning model outputs in accordance with the subject matter disclosed herein. According to an implementation, one or more machine learning models disclosed herein may continuously or periodically update based on feedback associated with use or implementation of the machine learning model outputs.

It should be understood that aspects in this disclosure are exemplary only, and that other aspects may include various combinations of features from other aspects, as well as additional or fewer features.

In general, any process or operation discussed in this disclosure that is understood to be computer-implementable, such as the processes illustrated in the flowcharts disclosed herein, may be performed by one or more processors of a computer system, such as any of the systems or devices in the exemplary environments disclosed herein, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices disclosed herein. One or more processors of a computer system may be included in a single computing device or distributed among a plurality of computing devices. A memory of the computer system may include the respective memory of each computing device of the plurality of computing devices.

Figure 16:
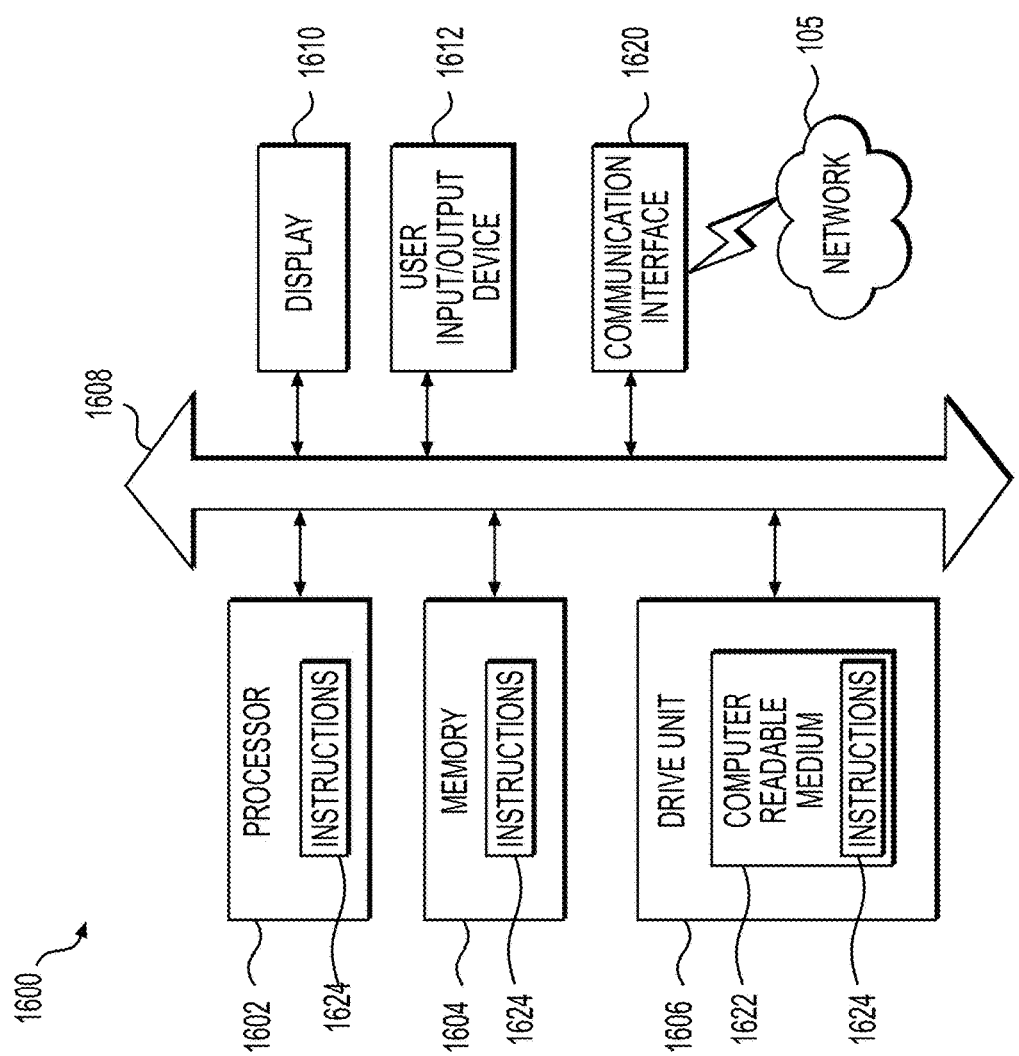
FIG. 16 depicts an example of a computing device, in accordance with one or more embodiments.

FIG. 16 is a simplified functional block diagram of a computer 1600 that may be configured as a device for executing the methods disclosed here, according to exemplary aspects of the present disclosure. For example, the computer 1600 may be configured as a system according to exemplary aspects of this disclosure. In various aspects, any of the systems herein may be a computer 1600 including, for example, a data communication interface 1620 for packet data communication. The computer 1600 also may include a central processing unit ("CPU") 1602, in the form of one or more processors, for executing program instructions. The computer 1600 may include an internal communication bus 1608, and a storage unit 1606 (such as ROM, HDD, SDD, etc.) that may store data on a computer readable medium 1622, although the computer 1600 may receive programming and data via network communications.

The computer 1600 may also have a memory 1604 (such as RAM) storing instructions 1624 for executing techniques presented herein, for example the methods described with respect to FIG. 2, although the instructions 1624 may be stored temporarily or permanently within other modules of computer 1600 (e.g., processing unit 1602 and/or computer readable medium 1622). The computer 1600 also may include input and output ports 1612 and/or a display 1610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed aspects may be applicable to any environment, such as a desktop or laptop computer, an automobile entertainment system, a home entertainment system, etc. Also, the disclosed aspects may be applicable to any type of Internet protocol.

It should be appreciated that in the above description of exemplary aspects of the invention, various features of the invention are sometimes grouped together in a single aspect, figure, or description thereof for the purpose of streamlining the disclosure and aiding in the understanding of one or more of the various inventive aspects. This method of disclosure, however, is not to be interpreted as reflecting an intention that the claimed embodiments requires more features than are expressly recited in each claim. Rather, as the following claims reflect, inventive aspects lie in less than all features of a single foregoing disclosed aspect. Thus, the claims following the Detailed Description are hereby expressly incorporated into this Detailed Description, with each claim standing on its own as a separate aspect of this invention.

Furthermore, while some aspects described herein include some but not other features included in other aspects, combinations of features of different aspects are meant to be within the scope of the invention, and form different aspects, as would be understood by those skilled in the art. For example, in the following claims, any of the claimed aspects can be used in any combination.

Thus, while certain aspects have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Operations may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed:

1. A method for generating a probability for a first action of a sporting event by implementing a feature set, the method comprising:
    obtaining an initial set of data relating to the first action of a sporting event, the initial set of data including at least a position of a first player on a surface and a position of a target area on the surface;
    generating, by a machine learning model, an initial projected scoring probability based on the initial set of data, wherein the machine learning model includes a generative adversarial network (GAN) model, and wherein the GAN model includes at least one of a set of monotonic constraints or a weight for each of the monotonic constraints;
    generating a feature set relating to the sporting event, the feature set being derived from any of a position of a second player on the surface, at least one of a distance or an angle between any of the first player, the second player, and the target area of the surface, wherein the first player and the second player are on opposing teams in the sporting event; and
    modifying, by the machine learning model, the initial projected scoring probability to an updated scoring probability using the feature set;
    wherein the feature set includes: a virtual line directed between the position of the first player and the position of the target area and a distance between the second player and an area of the virtual line;
    wherein the feature set further includes the second player's save probability permutation modifying a save probability for each of a set of shot locations at different angles from the virtual line between the position of the first player and the position of the target area.

2. The method of claim 1, wherein the feature set includes a previous action type specifying a previous action performed prior to an occurrence of the first action.

3. The method of claim 1, wherein any of the initial set of data and the feature set includes historical save probabilities for the second player.

4. A method for generating a projected save probability for a first action of a sporting event using a feature set, the method comprising:
- obtaining an initial set of data relating to the first action of a sporting event, the initial set of data including at least a position of an offensive player on a field and a position of a goal on the field;
- generating, by a machine learning model, an initial projected save probability based on the initial set of data, wherein the machine learning model includes a generative adversarial network (GAN) model, and wherein the GAN model comprises at least one of a set of monotonic constraints or a weight for each of the monotonic constraints;
- generating a feature set relating to the sporting event, the feature set derived from any of a position of a defending player on the field, at least one of a distance or an angle between any of the defending player, the offensive player, and the goal, or a presence of one or more additional players within a proximity of the defending player, the offensive player, and the goal; and
- modifying, by the machine learning model, the initial projected save probability to an updated projected save probability using the feature set;
- wherein the feature set includes: a virtual line directed between the position of the offensive player and the position of the goal; and a distance between the position of the defending player and the virtual line between the position of the offensive player and the position of the goal;
- wherein the feature set further includes a goalkeeper save probability permutation modifying a goalkeeper save probability for each of a set of shot locations at different angles from the virtual line between the position of the offensive player and the position of the goal.

5. The method of claim 4, wherein the feature set includes a clarity value specifying a number of intervening players positioned within a proximity of the virtual line between the position of the offensive player and the position of the goal.

6. The method of claim 4, wherein the feature set includes a previous action type specifying a previous action performed prior to an occurrence of the first action.

7. The method of claim 4, wherein the first action comprises a shot on the goal, the sporting event includes a soccer match, and the defending player is a goalkeeper.

8. The method of claim 7, wherein the feature set includes a shot archetype specifying one or more of a shot type, whether the shot is contested, a distance range of the shot, and/or whether the shot is from a central portion of the field or a lateral portion of the field.

9. The method of claim 4, wherein any of the initial set of data or the feature set includes historical save probabilities for the defending player.

10. A method for generating a projected point winner probability for a shot of a tennis match using a feature set, the method comprising:
- obtaining an initial set of data relating to an action of a sporting event, the initial set of data including at least a position of a first player on a surface and a position of a target area on a field;
- generating, by a machine learning model, an initial projected point winner probability based on the initial set of data, wherein the machine learning model includes a generative adversarial network (GAN) model, and wherein the GAN model comprises at least one of a set of monotonic constraints or a weight for each of the monotonic constraints;
- generating a feature set relating to the sporting event, the feature set derived from any of a position of a second player on the field, a distance and/or an angle between any of the second player, the first player, and the target area, or a presence of any additional players within a proximity of the second player, the first player, and the target area, wherein the first player and the second player are on opposing teams in the sporting event; and
- modifying, by the machine learning model, the initial projected point winner probability to an updated projected point winner probability using the feature set;
- wherein the feature set includes: a virtual line directed between the position of the first player and the position of the target area; and a distance between the position of the second player and the virtual line between the position of the first player and the target area,
- wherein the feature set further includes data of a shot trajectory, 3D body-pose information of the first player and second player, a current shot count, velocity and acceleration information of the first player and second player, a court surface type, and/or a shot type.

* * * * *